(12) United States Patent
Luo et al.

(10) Patent No.: US 11,121,781 B2
(45) Date of Patent: Sep. 14, 2021

(54) CALIBRATION METHOD AND APPARATUS

(71) Applicant: HUAWEI TECHNOLOGIES CO., LTD., Guangdong (CN)

(72) Inventors: Fan Luo, Shenzhen (CN); Feng Li, Xi'an (CN); Yue Liu, Dongguan (CN); Chaoyi Yan, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/887,644

(22) Filed: May 29, 2020

(65) Prior Publication Data

US 2020/0295851 A1   Sep. 17, 2020

Related U.S. Application Data

(63) Continuation of application No. PCT/CN2018/117722, filed on Nov. 27, 2018.

(30) Foreign Application Priority Data

Nov. 30, 2017   (CN) .......................... 201711243924.4
Aug. 23, 2018   (CN) .......................... 201810966862.8

(51) Int. Cl.
*H04W 24/00*   (2009.01)
*H04B 17/11*   (2015.01)
*H04B 17/21*   (2015.01)

(52) U.S. Cl.
CPC ............. *H04B 17/11* (2015.01); *H04B 17/21* (2015.01)

(58) Field of Classification Search
CPC ............... H04W 88/085; H04W 24/02; H04W 28/0226; H04W 28/0236; H04W 28/0284;
(Continued)

(56) References Cited

U.S. PATENT DOCUMENTS 10,326,689 B2 *   6/2019   Liu ....................... H04W 40/20
10,749,721 B2 *   8/2020   Fertonani ............ H04L 12/4604
(Continued)

FOREIGN PATENT DOCUMENTS

CN   103107836 A   5/2013
CN   103716075 A   4/2014
(Continued)

OTHER PUBLICATIONS

CN103107836B , Geng Jian English translation.*
(Continued)

*Primary Examiner* — Joseph Arevalo
(74) *Attorney, Agent, or Firm* — Fish & Richardson P.C.

(57) ABSTRACT

This application provides a calibration method: receiving, by a control apparatus of an RRU, resource configuration information, where a time-frequency resource indicated by the resource configuration information is used to send and receive a calibration signal between the RRU and n other RRUs, the n other RRUs are RRUs in a calibration path topology, a quantity of hops of a calibration path between the RRU and each of the n other RRUs is 1; controlling, based on the resource configuration information, the RRU to send and receive a calibration signal on the time-frequency resource; obtaining m groups of path information based on the calibration signal; obtaining m calibration coefficients based on the m groups of path information; and compensating M channels of the RRU by using the m calibration coefficients.

21 Claims, 16 Drawing Sheets

(58) Field of Classification Search
CPC ..... H04W 28/20; H04W 28/22; H04W 40/12; H04W 40/16; H04W 40/20; H04W 40/244; H04W 56/0045; H04W 72/0413; H04W 72/0446; H04W 76/00; H04W 76/14; H04W 88/08; H04W 88/16
USPC ... 455/423, 434, 450, 575.8, 445, 13.1, 522, 455/67.11, 403, 509, 513
See application file for complete search history.

(56) References Cited

U.S. PATENT DOCUMENTS

2012/0208584 A1    8/2012  Liao
2019/0313288 A1*  10/2019  Li ..................... H04W 28/0284

FOREIGN PATENT DOCUMENTS

| CN | 103856273 A | 6/2014 |
|---|---|---|
| CN | 106330350 A | 1/2017 |
| EP | 2493260 A1 | 8/2012 |
| WO | 2017000895 A2 | 1/2017 |

OTHER PUBLICATIONS

CN106330350B , Guan Lu English translation.*
PCT International Search Report and Written Opinion in International Application No. PCT/CN2018/117,722, dated Feb. 14, 2019, 18 pages (With English Translation).
CMCC, "Discussion on Necessity of the Study on Ran Virtualization," 3GPP TSG RAN #64 Meeting, RP-140705, Sophia Antipolis, France, Jun. 10-13, 2014, 4 pages.
Extended European Search Report issued in European Application No. 18884411.2 dated Dec. 1, 2020, 12 pages.
Rogalin et al,. "Hardware-impairment compensation for enabling distributed large-scale MIMO," 2013 Information Theory and Applications Workshop (ITA), May 27, 2013, 10 pages.
Office Action issued in Japanese Application No. 2020-529640 dated May 25, 2021, 19 pages (with English translation).

* cited by examiner

TO

CALIBRATION METHOD AND APPARATUS

CROSS-REFERENCE TO RELATED APPLICATIONS

This application is a continuation of International Application No. PCT/CN2018/117722, filed on Nov. 27, 2018, which claims priority to Chinese Patent Application No. 201711243924.4, filed on Nov. 30, 2017 and claims priority to Chinese Patent Application No. 201810966862.8, filed on Aug. 23, 2018. The disclosures of the aforementioned applications are hereby incorporated herein by reference in their entireties.

TECHNICAL FIELD

This application relates to the field of communications technologies, and in particular, to a calibration method and an apparatus.

BACKGROUND

During site deployment, to ensure that all users are covered, overlapping coverage occurs on a cell edge. An edge user within an overlapping coverage area receives both a wanted signal from a serving cell and an interference signal from another cell. Consequently, quality of the received signals is poor, and online experience is affected. To enhance coverage, improve spectrum efficiency, and improve handover performance, a coherent multipoint joint transmission (JT) technology is usually used to send a signal to a terminal by using a remote radio unit (RRU) in a coordinating cluster, so that an interference signal from another cell is converted into a wanted signal, and quality of signals received by the terminal is improved. Transmit-receive channel response ratios (ratios of transmit channel responses to receive channel responses) of RRUs that are in the coordinating cluster and that can implement JT are required to be equal. In an actual system, channel responses of RRUs are usually different. Therefore, a plurality of RRUs in the coordinating cluster need to be calibrated.

In a conventional calibration method, one RRU is used as a reference RRU to plan a calibration path topology, and a quantity of calibration paths is required to be a total quantity of RRUs minus 1. For example, FIG. 1 is a diagram of a calibration path topology of an RRU 1 to an RRU 9. There are a total of eight calibration paths. A quantity of hops of a calibration path between two RRUs connected to each other is 1. For example, the RRU 1 is directly connected to the RRU 2, and the RRU 5 is directly connected to the RRU 9. Therefore, a quantity of hops of a calibration path between the RRU 1 and the RRU 2 is 1, and a quantity of hops of a calibration path between the RRU 5 and the RRU 9 is 1. The RRU 3 is indirectly connected to the RRU 8 by using the RRU 1 and the RRU 2. Therefore, a quantity of hops of a calibration path between the RRU 3 and the RRU 8 is 3. The RRU 4 is indirectly connected to the RRU 6 by using the RRU 1, the RRU 2, the RRU 3, and the RRU 5. Therefore, a quantity of hops of a calibration path between the RRU 4 and the RRU 6 is 5. The RRU 1 is used as a reference RRU. Path information between the RRU 2 and the RRU 1 is obtained by using a calibration signal sent and received between the RRU 2 and the RRU 1. A calibration coefficient of the RRU 2 relative to the RRU 1 is calculated based on the path information, so that after the RRU 2 compensates channels by using the calibration coefficient, a transmit-receive channel response ratio of the RRU 2 is the same as a transmit-receive channel response ratio of the RRU 1. A calibration coefficient of the RRU 3 is calculated based on path information between the RRU 3 and the RRU 2 and the calibration coefficient of the RRU 2, so that after the RRU 3 compensates channels by using the calibration coefficient, a transmit-receive channel response ratio of the RRU 3 is the same as the transmit-receive channel response ratio of the RRU 1. Likewise, remaining RRUs are deduced by analogy based on the calibration path topology.

However, a calibration signal is sent over an air interface. Due to impact of an air interface environment, there is a calibration deviation when a calibration coefficient is calculated based on path information of each calibration path. However, a calibration deviation for a multi-hop connected calibration path is propagated. Consequently, calibration deviations between two RRUs having a calibration path with a large quantity of hops accumulate. A larger quantity of hops of a calibration path between two RRUs indicates a larger calibration deviation between the two RRUs. Consequently, calibration precision decreases.

SUMMARY

This application provides a calibration method and an apparatus, to reduce a calibration deviation between RRUs and improve calibration precision.

According to a first aspect, this application provides a calibration method. The method includes:

receiving, by a control apparatus of an RRU, resource configuration information sent by a centralized control apparatus, where a time-frequency resource indicated by the resource configuration information is used to send and receive a calibration signal between the RRU and n other RRUs, the n other RRUs are RRUs in a calibration path topology determined by the centralized control apparatus, a quantity of hops of a calibration path between the RRU and each of the n other RRUs is 1, and a quantity of hops of a shortest calibration path between any two RRUs in the calibration path topology is less than or equal to a preset hop quantity threshold, where n is a natural number greater than or equal to 1; controlling, by the control apparatus of the RRU based on the resource configuration information, the RRU to send and receive a calibration signal on the time-frequency resource; obtaining, by the control apparatus of the RRU, m groups of path information based on the calibration signal sent and received by the RRU, where m=1, or m=M, M is a quantity of channels of the RRU, and each of the m groups of path information includes path information of n calibration paths between one channel of the RRU and the n other RRUs; obtaining, by the control apparatus of the RRU, m calibration coefficients based on the m groups of path information; and compensating, by the control apparatus of the RRU, the M channels of the RRU by using the m calibration coefficients.

In the RRU calibration method provided in this application, the control apparatus of the RRU can obtain a calibration coefficient of the RRU by using a plurality of pieces of path information, thereby avoiding accumulation of calibration deviations that is caused by propagation of a calibration deviation on a multi-hop calibration path. In addition, the quantity of hops of the shortest calibration path between any two RRUs in the used calibration path topology is less than or equal to the preset hop quantity threshold. Therefore, a calibration deviation between RRUs is reduced, and calibration precision is improved.

Optionally, the obtaining, by the control apparatus of the RRU, m calibration coefficients based on the m groups of path information includes: calculating, by the control apparatus of the RRU, the m calibration coefficients based on the m groups of path information; or sending, by the control apparatus of the RRU, the m groups of path information to the centralized control apparatus, so that the centralized control apparatus calculates the m calibration coefficients based on the m groups of path information; and receiving, by the control apparatus of the RRU, the m calibration coefficients sent by the centralized control apparatus.

Optionally, when the M channels are not calibrated, m=M, the m groups of path information correspond one-to-one to the M channels, and the m calibration coefficients correspond one-to-one to the M channels.

In the optional implementations, when M channels of an RRU are not calibrated, the channels of the RRU can be calibrated by using the method provided in this application. In addition, a calibration coefficient of each channel is calculated based on a plurality of pieces of path information. Therefore, accumulation of calibration deviations that is caused by propagation of a calibration deviation on a multi-hop calibration path is avoided, a calibration deviation between RRUs is reduced, and calibration precision is improved.

Optionally, the controlling, by the control apparatus of the RRU based on the resource configuration information, the RRU to send and receive a calibration signal on the time-frequency resource includes: controlling, by the control apparatus of the RRU based on the resource configuration information, the M channels to simultaneously send calibration signals to each of the n other RRUs on M different carrier resources, and simultaneously receive, on n different frequency domain resources, calibration signals sent by the n other RRUs.

Optionally, the resource configuration information further includes a calibration cluster number of the RRU, and the controlling, by the control apparatus of the RRU based on the resource configuration information, the RRU to send and receive a calibration signal on the time-frequency resource includes: controlling, by the control apparatus of the RRU based on the calibration cluster number, a calibration signal that is sent by the RRU and that corresponds to the calibration cluster number, where the calibration signal sent by the RRU and a calibration signal sent by an RRU whose calibration cluster number is different from the calibration cluster number of the RRU are code division-orthogonal.

Resource utilization in a GP area can be improved by using a calibration signal with a code division function, so that more calibration signals can be sent between N RRUs, and more path information of calibration paths can be obtained to improve a calibration specification.

Optionally, the RRU is an RRU in a sub-cluster, and the method further includes: receiving, by the control apparatus of the RRU, an inter-cluster calibration coefficient, where the inter-cluster calibration coefficient is a calibration coefficient of a reference RRU in the sub-cluster to which the RRU belongs relative to a reference RRU in a reference sub-cluster, and the m calibration coefficients are calibration coefficients of the RRU relative to the reference RRU in the sub-cluster to which the RRU belongs; the compensating, by the control apparatus of the RRU, the M channels of the RRU by using the m calibration coefficients includes: separately multiplying, by the control apparatus of the RRU, the m calibration coefficients by the inter-cluster calibration coefficient, to obtain m joint calibration coefficients; and compensating, by the control apparatus of the RRU, the M channels of the RRU by using the m joint calibration coefficients.

Optionally, the RRU is an RRU in a sub-cluster, and the method further includes: controlling, by the control apparatus of the RRU, the RRU to send and receive a calibration signal with an RRU in each of i other sub-clusters, to obtain path information of i inter-cluster calibration paths between the RRU and the i RRUs in the i other sub-clusters, where i≥1; obtaining, by the control apparatus of the RRU, an inter-cluster calibration coefficient based on the path information of the i calibration paths; and sending, by the control apparatus of the RRU, the inter-cluster calibration coefficient to a control apparatus of another RRU in the sub-cluster to which the RRU belongs; the compensating, by the control apparatus of the RRU, the M channels of the RRU by using the m calibration coefficients includes: separately multiplying, by the control apparatus of the RRU, the m calibration coefficients by the inter-cluster calibration coefficient, to obtain m joint calibration coefficients.

According to a second aspect, this application provides a remote radio unit calibration method. The method includes: determining, by a centralized control apparatus, a calibration path topology based on signal quality between N RRUs, where in the calibration path topology, a quantity of hops of a calibration path between two RRUs between which signal quality is greater than or equal to a preset signal quality threshold is 1, and a quantity of hops of a shortest calibration path between any two RRUs is less than or equal to a preset hop quantity threshold; and allocating, by the centralized control apparatus, a time-frequency resource to each of the N RRUs based on the calibration path topology, and sending, to a control apparatus of each of the N RRUs, configuration information used to indicate the corresponding time-frequency resource, where the time-frequency resource corresponding to the RRU is used by the RRU to send and receive a calibration signal.

According to the calibration method provided in this application, in the calibration path topology determined by the centralized control apparatus, the quantity of hops of the calibration path between the two RRUs between which signal quality is greater than or equal to the preset signal quality threshold is 1, and the quantity of hops of the shortest calibration path between any two RRUs is less than or equal to the preset hop quantity threshold. Therefore, the control apparatus of the RRU can obtain a calibration coefficient of the RRU by using a plurality of pieces of path information, so that accumulation of calibration deviations that is caused by propagation of a calibration deviation on a multi-hop calibration path is avoided, a calibration deviation between RRUs is reduced, and calibration precision is improved.

Optionally, after the sending, by the centralized control apparatus to a control apparatus of each of the N RRUs, configuration information used to indicate the corresponding time-frequency resource, the method further includes: receiving, by the centralized control apparatus, N1 pieces of path information sent by the control apparatuses of the N RRUs, where the path information is path information of a calibration path on which a quantity of hops is 1, N−1≤N1≤$C_N^2$, $C_N^2$ represents a total quantity of calibration paths that is obtained when a quantity of hops of a calibration path between any two of the N RRUs is 1, where N1 is an integer; calculating, by the centralized control apparatus based on the N1 pieces of path information, a calibration coefficient corresponding to each of the N RRUs; and sending, by the centralized control apparatus, the corresponding calibration coefficient to the control apparatus of the RRU.

In the optional implementation, each calibration coefficient of the RRU is calculated based on the N1 pieces of path information. Therefore, propagation of a calibration deviation is eliminated, a calibration deviation between RRUs is reduced, and calibration precision is improved.

Optionally, the receiving, by the centralized control apparatus, N1 pieces of path information sent by the control apparatuses of the N RRUs includes: receiving, by the centralized control apparatus, m groups of path information from the control apparatus of the RRU, where each group of path information includes n pieces of path information, where m=1, or m=M, M is a quantity of channels of the RRU, and n is a quantity of RRUs, between each of which and the RRU a quantity of hops of a calibration path is 1, where there are m calibration coefficients corresponding to the RRU.

In the optional implementation, when M channels of an RRU are not calibrated, m=1, so that the channels of the RRU can be calibrated. In addition, a calibration coefficient of each channel is calculated based on a plurality of pieces of path information. Therefore, accumulation of calibration deviations that is caused by propagation of a calibration deviation on a multi-hop calibration path is avoided, a calibration deviation between RRUs is reduced, and calibration precision is improved.

Optionally, before the allocating, by the centralized control apparatus, a time-frequency resource to each of the N RRUs based on the calibration path topology, the method further includes: grouping, by the centralized control apparatus, the N RRUs into at least two calibration clusters, where the resource configuration information sent by the centralized control apparatus to the RRU further includes a calibration cluster number of a calibration cluster to which the RRU belongs.

Resource utilization in a GP area can be improved by using a calibration signal with a code division function, so that more calibration signals can be sent between the N RRUs, and more path information of calibration paths can be obtained to improve a calibration specification.

Optionally, the method further includes: periodically detecting, by the centralized control apparatus, the signal quality between the N RRUs; and re-determining, by the centralized control apparatus, a calibration path topology when signal quality between any two of the N RRUs changes from being greater than or equal to the signal quality threshold to being less than the signal quality threshold.

The signal quality between the N RRUs is periodically detected, to find a calibration path on which signal quality does not meet the signal quality threshold, and re-plan a calibration path topology, so that a calibration failure of a calibration path caused by a disconnection due to environment impact is avoided, where the calibration failure affects JT performance.

Optionally, before the determining, by a centralized control apparatus, a calibration path topology based on signal quality between N RRUs, the method further includes: grouping, by the centralized control apparatus, K RRUs into k sub-clusters, where each of h sub-clusters in the k sub-clusters includes one reference RRU, the k sub-clusters include at least one reference sub-cluster, and the N RRUs are all RRUs in one of the k sub-clusters.

Optionally, the centralized control apparatus receives path information of an inter-cluster calibration path that is sent by at least one RRU in the sub-cluster; the centralized control apparatus calculates, based on received path information of all inter-cluster calibration paths, an inter-cluster calibration coefficient corresponding to each of the at least one RRU in the sub-cluster; the centralized control apparatus sends the corresponding inter-cluster calibration coefficient to each of the at least one RRU in the sub-cluster.

According to a third aspect, a control apparatus of an RRU includes:

a transceiver unit, configured to receive resource configuration information sent by a centralized control apparatus, where a time-frequency resource indicated by the resource configuration information is used to send and receive a calibration signal between the RRU and n other RRUs, the n other RRUs are RRUs in a calibration path topology determined by the centralized control apparatus, a quantity of hops of a calibration path between the RRU and each of the n other RRUs is 1, and a quantity of hops of a shortest calibration path between any two RRUs in the calibration path topology is less than or equal to a preset hop quantity threshold, where n is a natural number greater than or equal to 1; and a processing unit, configured to: control, based on the resource configuration information received by the transceiver unit, the RRU to send and receive the calibration signal on the time-frequency resource; obtain m groups of path information based on the calibration signal sent and received by the RRU, where m=1, or m=M, M is a quantity of channels of the RRU, and each of the m groups of path information includes path information of n calibration paths between one channel of the RRU and the n other RRUs; obtain m calibration coefficients based on the m groups of path information; and compensate the M channels of the RRU by using the m calibration coefficients.

Optionally, that the processing unit obtains the m calibration coefficients based on the m groups of path information specifically includes: calculating the m calibration coefficients based on the m groups of path information; or sending the m groups of path information to the centralized control apparatus, so that the centralized control apparatus calculates the m calibration coefficients based on the m groups of path information; and receiving the m calibration coefficients sent by the centralized control apparatus.

Optionally, when the M channels are not calibrated, m=M, the m groups of path information correspond one-to-one to the M channels, and the m calibration coefficients correspond one-to-one to the M channels.

Optionally, that the processing unit controls, based on the resource configuration information, the RRU to send and receive a calibration signal on the time-frequency resource specifically includes: controlling, based on the resource configuration information, the M channels to simultaneously send calibration signals to each of the n other RRUs on M different carrier resources, and simultaneously receive, on n different frequency domain resources, calibration signals sent by the n other RRUs.

Optionally, the resource configuration information further includes a calibration cluster number of the RRU, and that the processing unit controls, based on the resource configuration information, the RRU to send and receive a calibration signal on the time-frequency resource specifically includes: controlling, based on the calibration cluster number, a calibration signal that is sent by the RRU and that corresponds to the calibration cluster number, where the calibration signal sent by the RRU and a calibration signal sent by an RRU whose calibration cluster number is different from the calibration cluster number of the RRU are code division-orthogonal.

Optionally, the RRU is an RRU in a sub-cluster; the processing unit is further configured to receive an inter-cluster calibration coefficient, where the inter-cluster calibration coefficient is a calibration coefficient of a reference RRU in the sub-cluster to which the RRU belongs relative to a reference RRU in a reference sub-cluster, and the m calibration coefficients are calibration coefficients of the RRU relative to the reference RRU in the sub-cluster to which the RRU belongs; that the processing unit compensates the M channels of the RRU by using the m calibration coefficients specifically includes: separately multiplying the m calibration coefficients by the inter-cluster calibration coefficient, to obtain m joint calibration coefficients; and compensating the M channels of the RRU by using the m joint calibration coefficients.

Optionally, the RRU is an RRU in a sub-cluster; the transceiver unit is further configured to control the RRU to send and receive a calibration signal with an RRU in each of i other sub-clusters, to obtain path information of i inter-cluster calibration paths between the RRU and the i RRUs in the i other sub-clusters, where i≥1; the processing unit is further configured to: obtain an inter-cluster calibration coefficient based on the path information of the i calibration paths; and send the inter-cluster calibration coefficient to a control apparatus of another RRU in the sub-cluster to which the RRU belongs; that the processing unit compensates the M channels of the RRU by using the m calibration coefficients specifically includes: separately multiplying the m calibration coefficients by the inter-cluster calibration coefficient, to obtain m joint calibration coefficients.

For technical effects of the control apparatus of the RRU provided in this application, refer to technical effects of the first aspect or the implementations of the first aspect. Details are not described herein again.

According to a fourth aspect, this application provides a centralized control apparatus, including:

a determining unit, configured to determine a calibration path topology based on signal quality between N RRUs, where in the calibration path topology, a quantity of hops of a calibration path between two RRUs between which signal quality is greater than or equal to a preset signal quality threshold is 1, and a quantity of hops of a shortest calibration path between any two RRUs is less than or equal to a preset hop quantity threshold; and a sending unit, configured to: allocate a time-frequency resource to each of the N RRUs based on the calibration path topology determined by the determining unit, and send, to a control apparatus of each of the N RRUs, configuration information used to indicate the corresponding time-frequency resource, where the time-frequency resource corresponding to the RRU is used by the RRU to send and receive a calibration signal.

Optionally, the centralized control apparatus further includes a receiving unit and a calculation unit, and after the centralized control apparatus sends, to the control apparatus of the RRU, the configuration information used to indicate the corresponding time-frequency resource, the receiving unit is configured to receive N1 pieces of path information sent by the control apparatuses of the N RRUs, where the path information is path information of a calibration path on which a quantity of hops is 1, N−1≤N1≤$C_N^2$, where N1 is an integer; the calculation unit is configured to calculate, based on the N1 pieces of path information received by the receiving unit, a calibration coefficient corresponding to the RRU; the sending unit is further configured to send the corresponding calibration coefficient to the control apparatus of the RRU.

Optionally, that the receiving unit receives the N1 pieces of path information sent by the control apparatuses of the N RRUs specifically includes: receiving m groups of path information from the control apparatus of the RRU, where each group of path information includes n pieces of path information, where m=1, or m=M, M is a quantity of channels of the RRU, and n is a quantity of RRUs, between each of which and the RRU a quantity of hops of a calibration path is 1, where there are m calibration coefficients corresponding to the RRU.

Optionally, the determining unit is further configured to group the N RRUs into at least two calibration clusters before the sending unit allocates the time-frequency resource to each of the N RRUs based on the calibration path topology; the resource configuration information sent by the sending unit to the RRU further includes a calibration cluster number of a calibration cluster to which the RRU belongs.

Optionally, the centralized control apparatus further includes a detection unit, where the detection unit is configured to periodically detect the signal quality between the N RRUs; the determining unit is further configured to re-determine a calibration path topology when the detection unit finds, through detection, that signal quality between any two of the N RRUs changes from being greater than or equal to the signal quality threshold to being less than the signal quality threshold.

Optionally, the determining unit is further configured to group K RRUs into k sub-clusters before determining the calibration path topology based on the signal quality between the N RRUs, where each of h sub-clusters in the k sub-clusters includes one reference RRU, the k sub-clusters include at least one reference sub-cluster, and the N RRUs are all RRUs in one of the k sub-clusters.

Massive RRUs are grouped into a plurality of sub-clusters, and intra-cluster calibration is performed on RRUs in each sub-cluster synchronously to accelerate calibration.

Optionally, the receiving unit is further configured to receive path information of an inter-cluster calibration path that is sent by at least one RRU in the sub-cluster; the calculation unit is further configured to calculate, based on path information of all inter-cluster calibration paths that is received by the receiving unit, an inter-cluster calibration coefficient corresponding to each of the at least one RRU in the sub-cluster; the sending unit is further configured to send the corresponding inter-cluster calibration coefficient to each of the at least one RRU in the sub-cluster.

For technical effects of the centralized control apparatus provided in this application, refer to technical effects of the second aspect or the implementations of the second aspect. Details are not described herein again.

According to a fifth aspect, this application further provides a control apparatus of an RRU. The control apparatus of the RRU includes a processor, a memory, a bus, and a transceiver. The memory is configured to store a computer executable instruction. The processor is connected to the memory and the transceiver by using the bus. When the control apparatus of the RRU runs, the processor executes the computer executable instruction stored in the memory, to implement the calibration method in the first aspect and the implementations of the first aspect.

For technical effects of the control apparatus of the RRU provided in this application, refer to technical effects of the first aspect or the implementations of the first aspect. Details are not described herein again.

According to a sixth aspect, this application further provides a centralized control apparatus, including a processor, a memory, a bus, and a transceiver. The memory is configured to store a computer executable instruction. The processor is connected to the memory and the transceiver by using the bus. When the centralized control apparatus runs, the processor executes the computer executable instruction stored in the memory, to implement the calibration method in the second aspect and the implementations of the second aspect.

For technical effects of the centralized control apparatus provided in this application, refer to technical effects of the second aspect or the implementations of the second aspect. Details are not described herein again.

According to a seventh aspect, this application further provides a computer storage medium. The computer storage medium stores an instruction. When run on a computer, the instruction enables the computer to perform the method in the first aspect or the second aspect.

According to an eighth aspect, this application further provides a computer program product including an instruction. When run on a computer, the computer program product enables the computer to perform the method in the first aspect or the second aspect.

According to a ninth aspect, this application provides a communications apparatus, including units or means configured to perform the steps in the first aspect and/or the second aspect. Optionally, the communications apparatus may be a chip.

DESCRIPTION OF EMBODIMENTS

A calibration method provided in this application may be applicable to an LTE system, a long term evolution advanced (LTE-A) system, or other wireless communications systems using various radio access technologies, for example, a system using an access technology such as code division multiple access, frequency division multiple access, time division multiple access, orthogonal frequency division multiple access, or CA. In addition, the calibration method may be further applied to a subsequent evolved system such as a fifth-generation 5G system. This application is applied to a scenario having a JT requirement, for example, distributed multiple-input multiple-output (D-MIMO) and a user-centric borderless network.

Figure 2A:
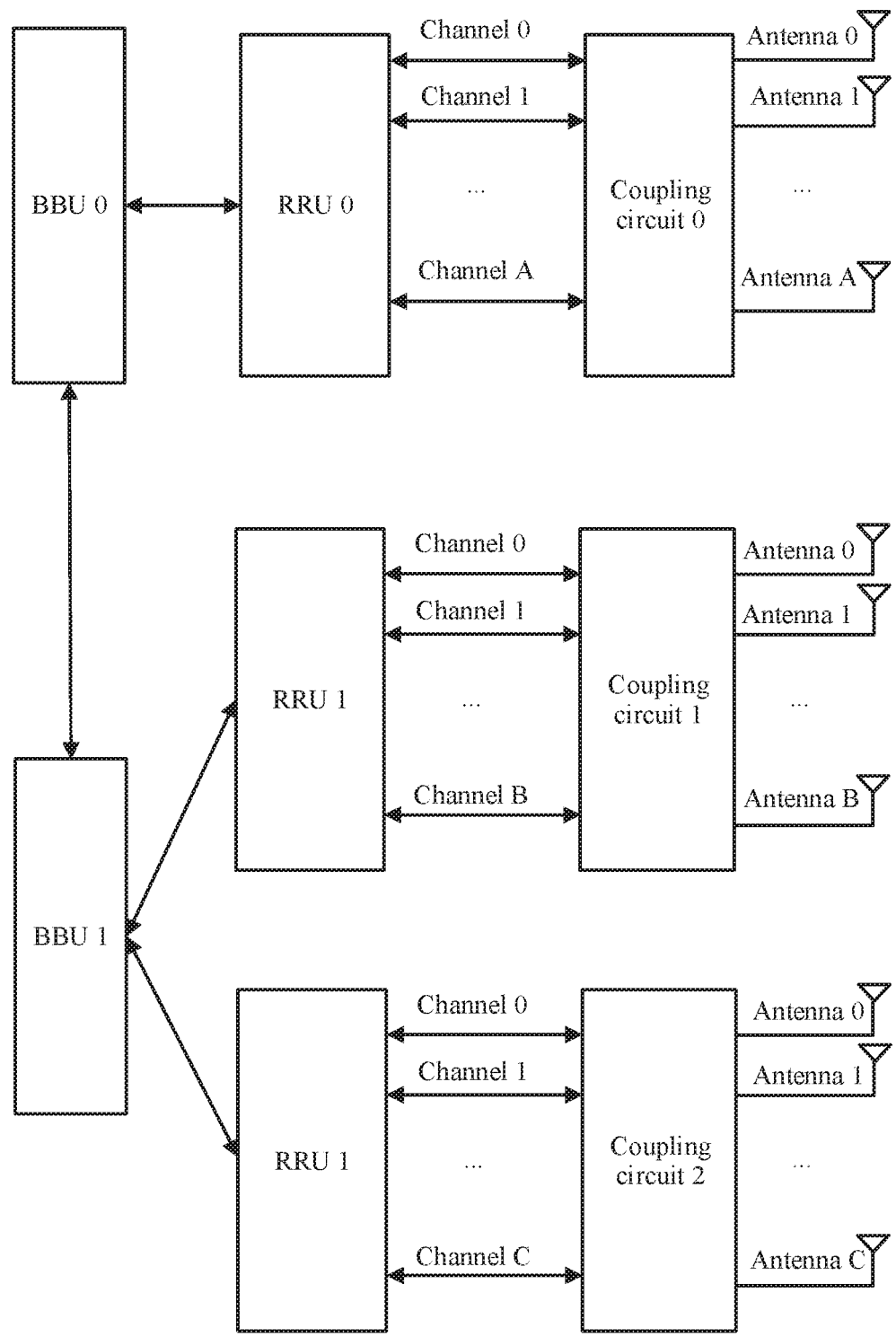
FIG. 2A is a schematic diagram of a distributed base station system according to this application.

Optionally, the calibration method provided in this application may be applied to a distributed base station. As shown in FIG. 2A, the distributed base station includes RRUs, building baseband units (BBU), coupling circuits, and antennas.

The RRU includes a digital intermediate frequency module, a transceiver module, a power amplification module, and a filtering module. The digital intermediate frequency module is used for modulation and demodulation in optical transmission, digital up- and down-frequency conversion, an analog-to-digital (AD) converter, and the like. The transceiver module converts an intermediate frequency signal into a radio-frequency signal, and transmits the radio frequency signal by using an antenna port after the radio frequency signal is processed by the power amplification module and the filtering module. The BBU is configured to complete functions such as channel coding and decoding, modulation and demodulation of a baseband signal, and protocol processing, provide an interface between the BBU and an upper-layer network element, and complete a processing process of a physical layer core technology, for example, code division multiple access (CDMA) processing in 3G and orthogonal frequency division multiplexing (OFDM)/multiple-input multiple-output (MIMO) processing in LTE. The BBUs, the RRUs, and the antennas are connected by using channels. The coupling circuit is configured to compensate channels. One BBU may control at least one RRU, and the BBUs are directly connected in a wired manner.

Figure 2B:
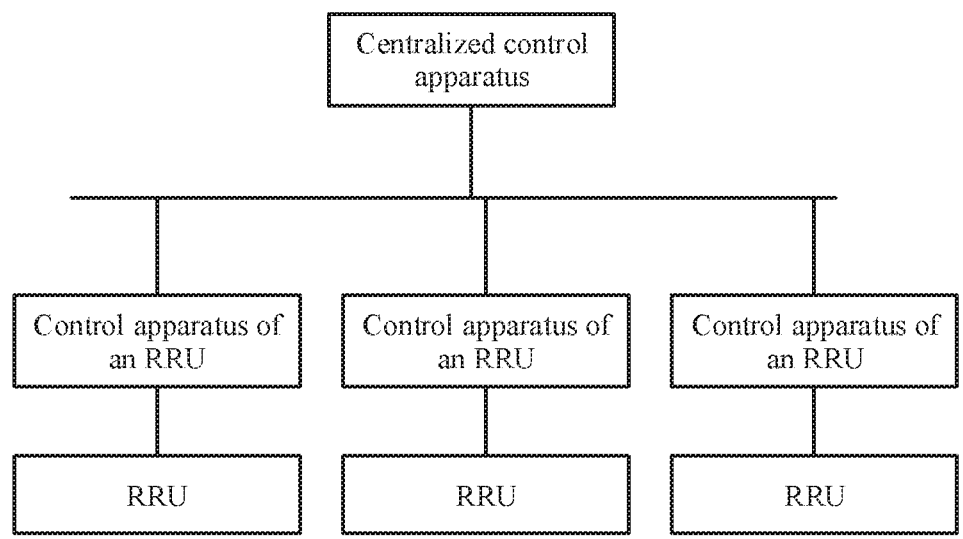
FIG. 2B is a schematic diagram of a communications system according to this application.

FIG. 2B shows a communications system according to this application. The communications system includes a centralized control apparatus, control apparatuses of RRUs, and the RRUs.

The control apparatus of the RRU is configured to control the RRU to send and receive a calibration signal, collect path information of a calibration path, calculate a calibration coefficient of the controlled RRU, compensate a transmit channel and a receive channel of the RRU, and so on.

In this application, the control apparatus of the RRU may be a BBU connected to the RRU, or may be a control module integrated into the RRU, or may be a server device that is disposed independent of the RRU and that can implement the foregoing functions.

The centralized control apparatus is configured to plan a calibration path topology, plan a calibration cluster, allocate a time-frequency resource used to transmit a calibration signal, calculate a calibration coefficient, and so on.

The centralized control apparatus may be a server device or a communications device that can implement the foregoing functions, or may be a control apparatus of an RRU, in other words, a control apparatus of an RRU is used as the centralized control apparatus. In this case, the control apparatus of the RRU has the functions of the centralized control apparatus.

Figure 3:
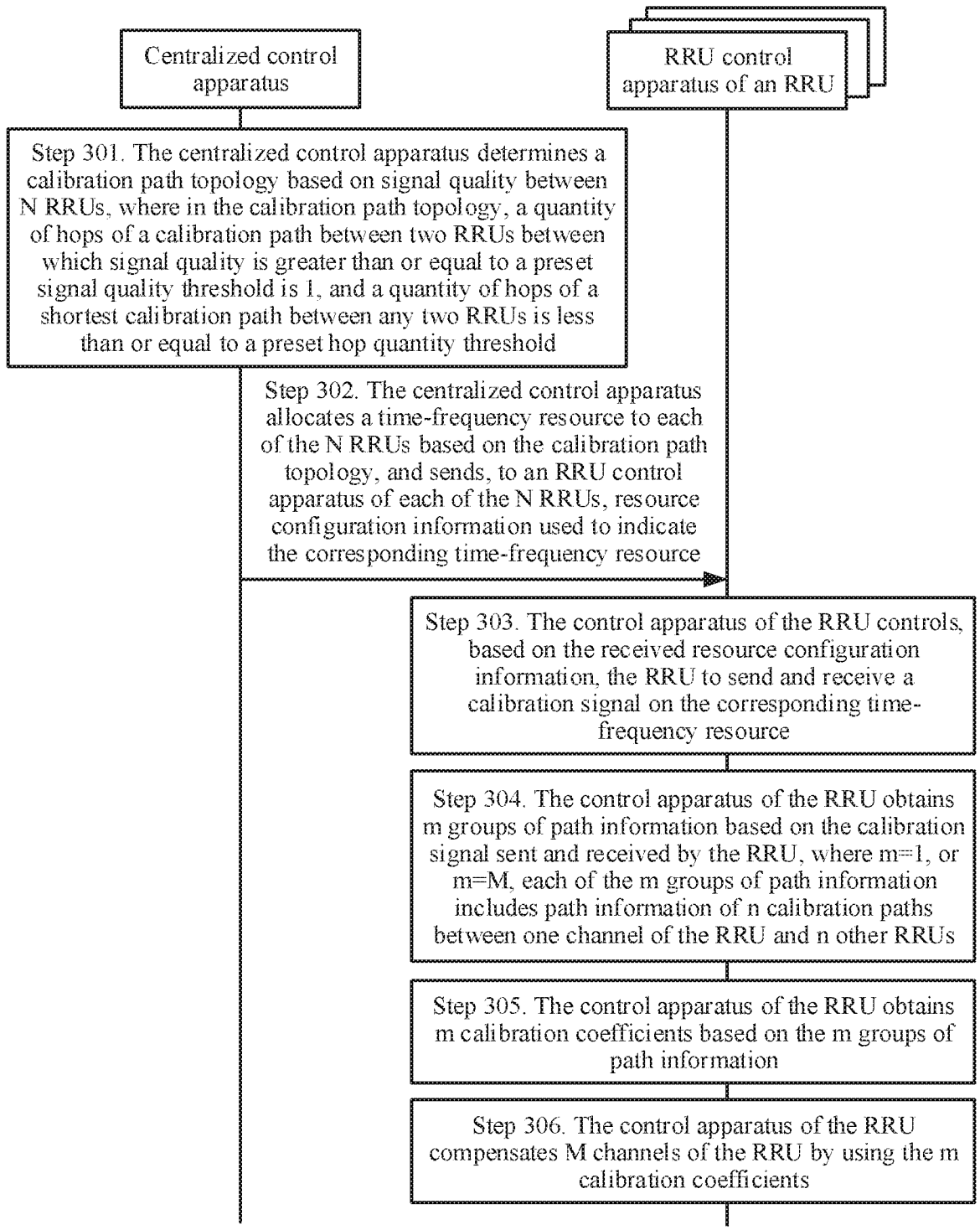
FIG. 3 is a method flowchart 1 of an embodiment of a calibration method according to this application.

Based on FIG. 2A, FIG. 2B, and FIG. 3 is a method flowchart of an embodiment of a calibration method according to this application. The method includes the following steps.

Step 301. A centralized control apparatus determines a calibration path topology based on signal quality between N RRUs, where in the calibration path topology, a quantity of hops of a calibration path between two RRUs between which signal quality is greater than or equal to a preset signal quality threshold is 1, and a quantity of hops of a shortest calibration path between any two RRUs is less than or equal to a preset hop quantity threshold.

For example, when determining the calibration path topology, the centralized control apparatus may first establish a direct connection relationship between any two RRUs that are in the N RRUs and between which signal quality is greater than or equal to a signal quality threshold, so that a quantity of hops of a calibration path between any two RRUs between which the signal quality is greater than or equal to the signal quality threshold is 1. In other words, each RRU can establish a direct connection relationship with all RRUs each having signal quality greater than or equal to the signal quality threshold with the RRU, so that the quantity of hops of the shortest calibration path between any two of the N RRUs is less than or equal to the hop quantity threshold.

For example, in an RRU 1 to an RRU 9, the centralized control apparatus finds, through detection, that signal quality between the RRU 1 and each of the RRU 2, the RRU 5, the RRU 7, and the RRU 8 is greater than or equal to the signal quality threshold, signal quality between the RRU 2 and each of the RRU 8, the RRU 6, and the RRU 3 is greater than or equal to the signal quality threshold, signal quality between the RRU 3 and both the RRU 5 and the RRU 4 is greater than or equal to the signal quality threshold, signal quality between the RRU 4 and the RRU 6 is greater than or equal to the signal quality threshold, signal quality between the RRU 5 and both the RRU 6 and the RRU 9 is greater than or equal to the signal quality threshold, signal quality between the RRU 6 and the RRU 9 is greater than or equal to the signal quality threshold, and signal quality between the RRU 7 and the RRU 9 is further greater than or equal to the signal quality threshold.

Figure 4:
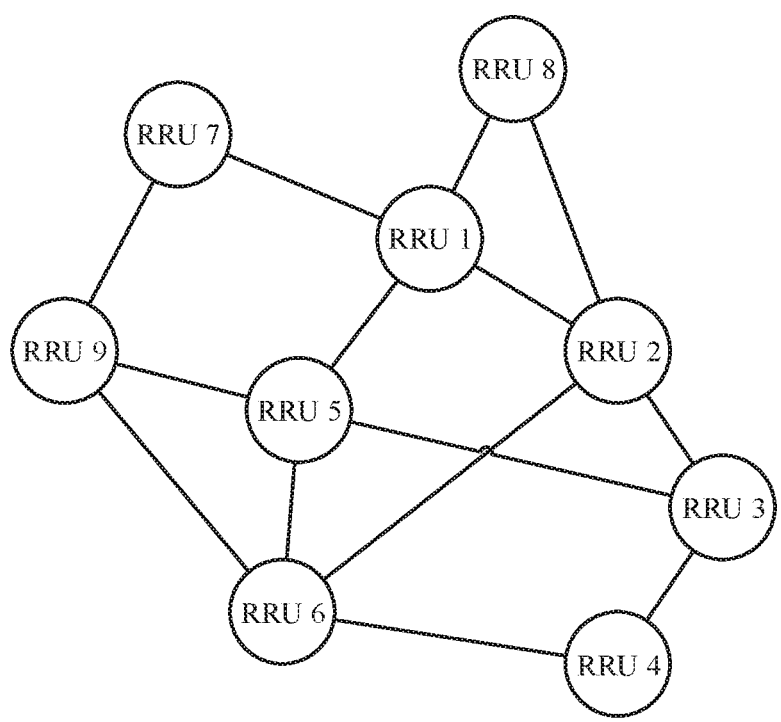
FIG. 4 is a schematic diagram 1 of a calibration path topology according to this application.

The centralized control apparatus establishes a direct connection relationship between two RRUs that are in the foregoing RRUs and between which signal quality is greater than or equal to the signal quality threshold, so that a quantity of hops of a calibration path connected between the two RRUs is 1, to obtain a calibration path topology shown in FIG. 4.

It is assumed that the hop quantity threshold is 3, and the centralized control apparatus determines that in the calibration path topology shown in FIG. 4, a quantity of hops of a shortest calibration path between any two RRUs is less than 4. Therefore, the calibration path topology shown in FIG. 4 is determined as a calibration path topology used in this calibration process.

Figure 1:
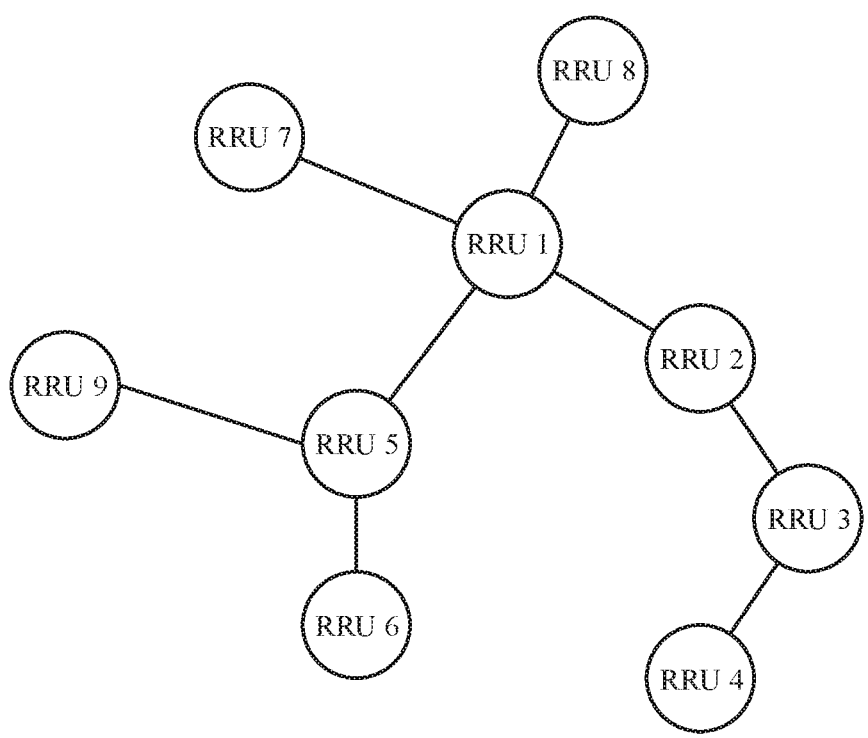
FIG. 1 is a schematic diagram of a calibration path topology in the prior art.

Compared with the calibration path topology shown in FIG. 1, it can be learned that in the prior art, a quantity of hops of a calibration path between the RRU 6 and the RRU 4 is 5, while in this application, a quantity of hops of a shortest calibration path between the RRU 6 and the RRU 4 is 1. That is, the RRU 6 and the RRU 4 may have a direct connection relationship. Therefore, a quantity of hops of a shortest calibration path between RRUs can be decreased by using the calibration path topology provided in this application.

Step 302. The centralized control apparatus allocates a time-frequency resource to each of the N RRUs based on the calibration path topology, and sends, to a control apparatus of each of the N RRUs, resource configuration information used to indicate the corresponding time-frequency resource, where the time-frequency resource corresponding to the RRU is used by the RRU to send and receive a calibration signal.

After separately receiving corresponding resource configuration information, all the N RRUs perform the following steps 303 to 305.

Step 303. The control apparatus of the RRU controls, based on the received resource configuration information, the RRU to send and receive the calibration signal on the corresponding time-frequency resource.

In the calibration path topology, there are n (n is a natural number greater than or equal to 1) other RRUs, where a quantity of hops of a calibration path between the RRU and each of the n other RRUs is 1. Therefore, after receiving the resource configuration information corresponding to the RRU, the control apparatus of the RRU may control the RRU to send and receive calibration signals to and from the n other RRUs on the time-frequency resource indicated by the resource configuration information.

In an example, if M channels of the RRU do not need to be calibrated (for example, the M channels have been calibrated), the control apparatus of the RRU may control any one of the M channels to send and receive calibration signals to and from the n other RRUs.

The RRU may send and receive the calibration signal in a frequency division manner. That is, when the RRU sends calibration signals to the n other RRUs, the RRU sends the calibration signals to the n other RRUs on a same time domain resource and a same frequency domain resource. When the RRU receives calibration signals sent by the n other RRUs, the RRU receives, on a same time domain resource and n different frequency domain resources, the calibration signals sent by the n other RRUs. That is, the n other RRUs simultaneously send the calibration signals to the RRU on the n different frequency domain resources.

Optionally, if the M channels of the RRU and calibration are not calibrated and need to be calibrated, the control apparatus of the RRU may control each of the M channels to send and receive calibration signals to and from the n other RRUs.

In an example, the control apparatus of the RRU may control, based on the resource configuration information, the M channels to simultaneously send calibration signals to each of the n other RRUs on M different carrier (or subcarrier) resources, and simultaneously receive, on n different frequency domain resources, calibration signals sent by the n other RRUs. In other words, the n other RRUs simultaneously send the calibration signals to the M channels on the n different frequency domain resources, and each of the M channels detects, on the n different frequency domain resources at a same moment, the calibration signals sent by the n other RRUs.

It may be understood that, before the centralized control apparatus allocates the time-frequency resource to the RRU, the control apparatus of the RRU may notify, by using a message, the centralized control apparatus whether the M channels of the RRU need to be calibrated, so that the centralized control apparatus can allocate an appropriate quantity of time-frequency resources.

Step 304. The control apparatus of the RRU obtains m groups of path information based on the calibration signal sent and received by the RRU, where m=1, or m=M, each of the m groups of path information includes path information of n calibration paths between one channel of the RRU and the n other RRUs.

For example, the path information may include information such as signals and air interface channel responses that are received on channels at two ends of a calibration path.

When the control apparatus of the RRU controls any channel to send and receive a calibration signal, the control apparatus of the RRU may obtain m (m=1) groups of path information.

When the control apparatus of the RRU controls the M channels to separately send and receive calibration signals, the control apparatus of the RRU may obtain M groups of path information based on the calibration signals sent and received by the RRU, where the M groups of path information correspond one-to-one to the M channels.

Step 305. The control apparatus of the RRU obtains m calibration coefficients based on the m groups of path information.

For example, the control apparatus of the RRU may calculate the m calibration coefficients based on the m groups of path information.

In this application, if m=1, the control apparatus of the RRU may calculate a calibration coefficient based on n pieces of path information and a transmit-receive channel response reference value. In this way, after the control apparatus of the RRU compensates the M channels of the RRU by using the calibration coefficient, a transmit-receive channel response ratio of the M channels is equal to or approximately equal to the transmit-receive channel response reference value.

If m=M, the control apparatus of the RRU may perform joint calculation based on m*M pieces of path information and the transmit-receive channel response reference value, to obtain M calibration coefficients corresponding one-to-one to the M channels. In this way, after the control apparatus of the RRU compensates the M channels of the RRU by using the M calibration coefficients, a transmit-receive channel response ratio of the M channels is equal to or approximately equal to the transmit-receive channel response reference value.

The transmit-receive channel response reference value may be a preset value, or may be a transmit-receive channel response ratio of one of the N RRUs.

It should be noted that, the calibration path topology in FIG. 4 is used as an example. When calibration coefficients of the RRU 6 and the RRU 4 are calculated, path information of a calibration path between the RRU 6 and the RRU 4 is also referenced. Therefore, there is no accumulation of deviations between the RRU 6 and the RRU 4 due to deviation propagation, so that a calibration deviation between the RRU 6 and the RRU 4 is reduced, and calibration precision is improved.

Step 306. The control apparatus of the RRU compensates the M channels of the RRU by using the m calibration coefficients.

For example, a process in which the control apparatus of the RRU compensates the M channels may be: When a channel is used as a receive channel to receive a signal, the received signal may be multiplied by a corresponding calibration coefficient. When the channel is used as a transmit channel to send a signal, the sent signal may be divided by a corresponding calibration coefficient.

Figure 5A:
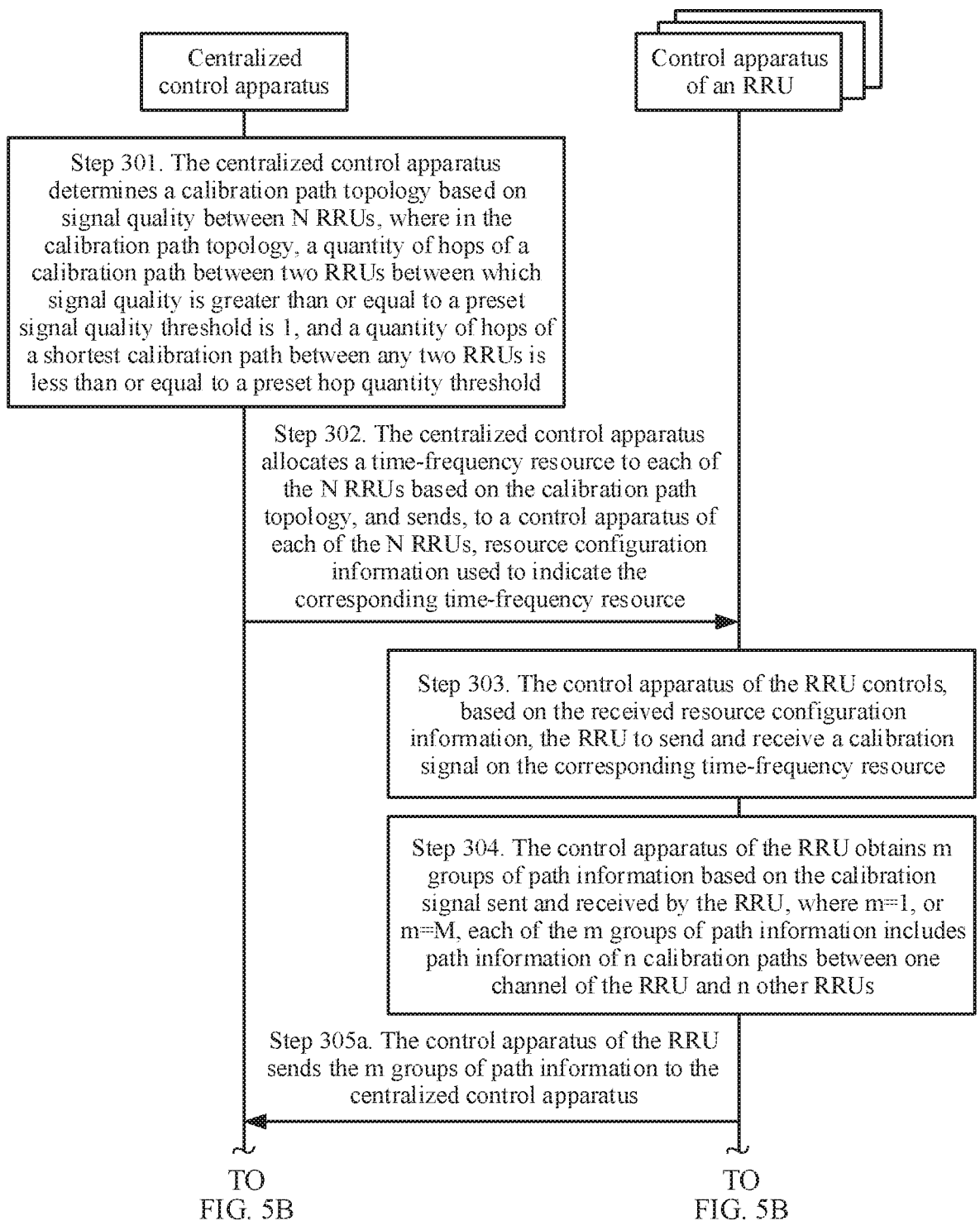
FIG. 5A and FIG. 5B are a method flowchart 2 of an embodiment of a calibration method according to this application.
Figure 5B:
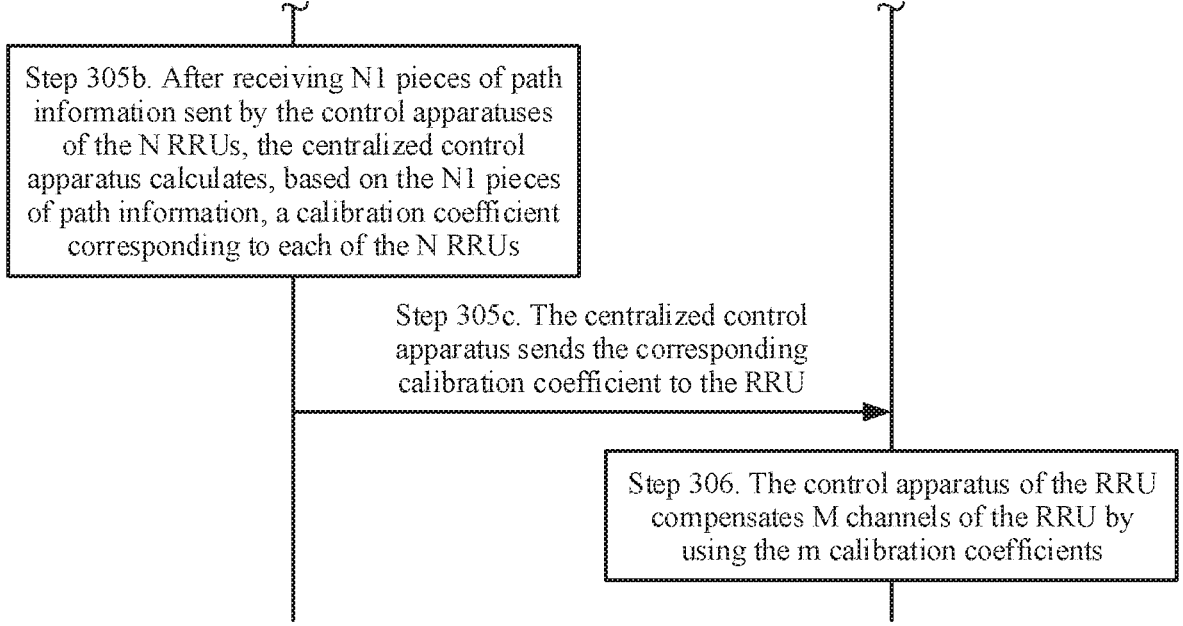

Optionally, the m calibration coefficients obtained by the control apparatus of the RRU in step 305 may alternatively be calculated by the centralized control apparatus. As shown in FIG. 5A and FIG. 5B, step 305 may specifically include the following steps.

Step 305a. The control apparatus of the RRU sends the m groups of path information to the centralized control apparatus.

Step 305b. After receiving N1 pieces of path information sent by the control apparatuses of the N RRUs, the centralized control apparatus calculates, based on the N1 pieces of path information, a calibration coefficient corresponding to each of the N RRUs.

N1 is a total quantity of pieces of path information sent by the control apparatuses of the N RRUs, where $N-1 \le N1 \le C_N^2$, $C_N^2$ represents a total quantity of calibration paths obtained when a quantity of hops of a calibration path between any two of the N RRUs is 1, and N1 is an integer.

The centralized control apparatus may perform joint calculation on the N1 pieces of path information by using the transmit-receive channel response reference value, to obtain the m calibration coefficients corresponding to the RRU. In other words, in this example, each calibration coefficient of the RRU is calculated based on the N1 pieces of path information. Therefore, propagation of a calibration deviation is eliminated, reducing a calibration deviation between the RRUs and improving calibration precision.

Step 305c. The centralized control apparatus sends the corresponding calibration coefficient to the RRU.

Optionally, in this application, the centralized control apparatus may periodically detect the signal quality between the N RRUs. When signal quality between any two of the N RRUs changes from being greater than or equal to the signal quality threshold to being less than the signal quality threshold, the centralized control apparatus may re-determine a new calibration path topology based on the signal quality that is between the N RRUs and that is found through detection within the period, and re-execute processes in the foregoing steps 301 to 306.

Figure 6:
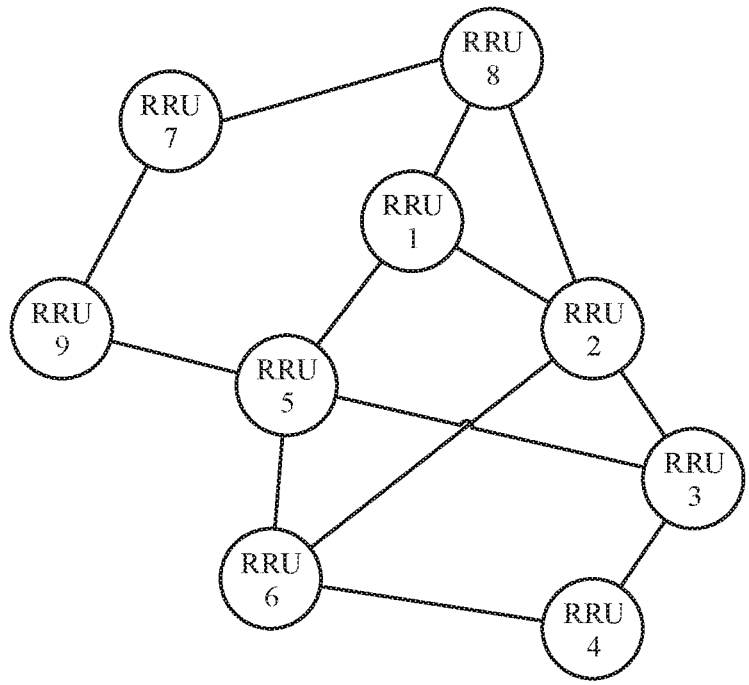
FIG. 6 is a schematic diagram 2 of a calibration path topology according to this application.

For example, a current calibration path topology is shown in FIG. 4, and the centralized control apparatus periodically detects signal quality between the RRU 1 to the RRU 9. It is assumed that the centralized control apparatus finds, through detection in the current period, that signal quality between the RRU 1 and the RRU 7 and signal quality between the RRU 9 and the RRU 6 change from being greater than the signal quality threshold to being less than the signal quality threshold. Signal quality between the RRU 7 and the RRU 8 is greater than the signal quality threshold. The centralized control apparatus disconnects a direct connection relationship between the RRU 1 and the RRU 7 and a direct connection relationship between the RRU 9 and the RRU 6, and establishes a direct connection relationship between the RRU 7 and the RRU 8, to obtain an updated calibration path topology, as shown in FIG. 6.

In this example, the signal quality between the N RRUs is periodically detected, to find, in time, a calibration path on which signal quality does not meet the signal quality threshold, and re-plan a calibration path topology, so that a calibration failure of a calibration path caused by a disconnection due to environment impact is avoided, where the calibration failure affects JT performance.

Optionally, because a calibration signal is usually sent and received in a guard period (GP) area, and time-frequency domain resources in the GP area are limited, to ensure that an RRU can obtain more path information, the calibration signal used in this application may be a calibration sequence with a code division function.

Figure 7A:
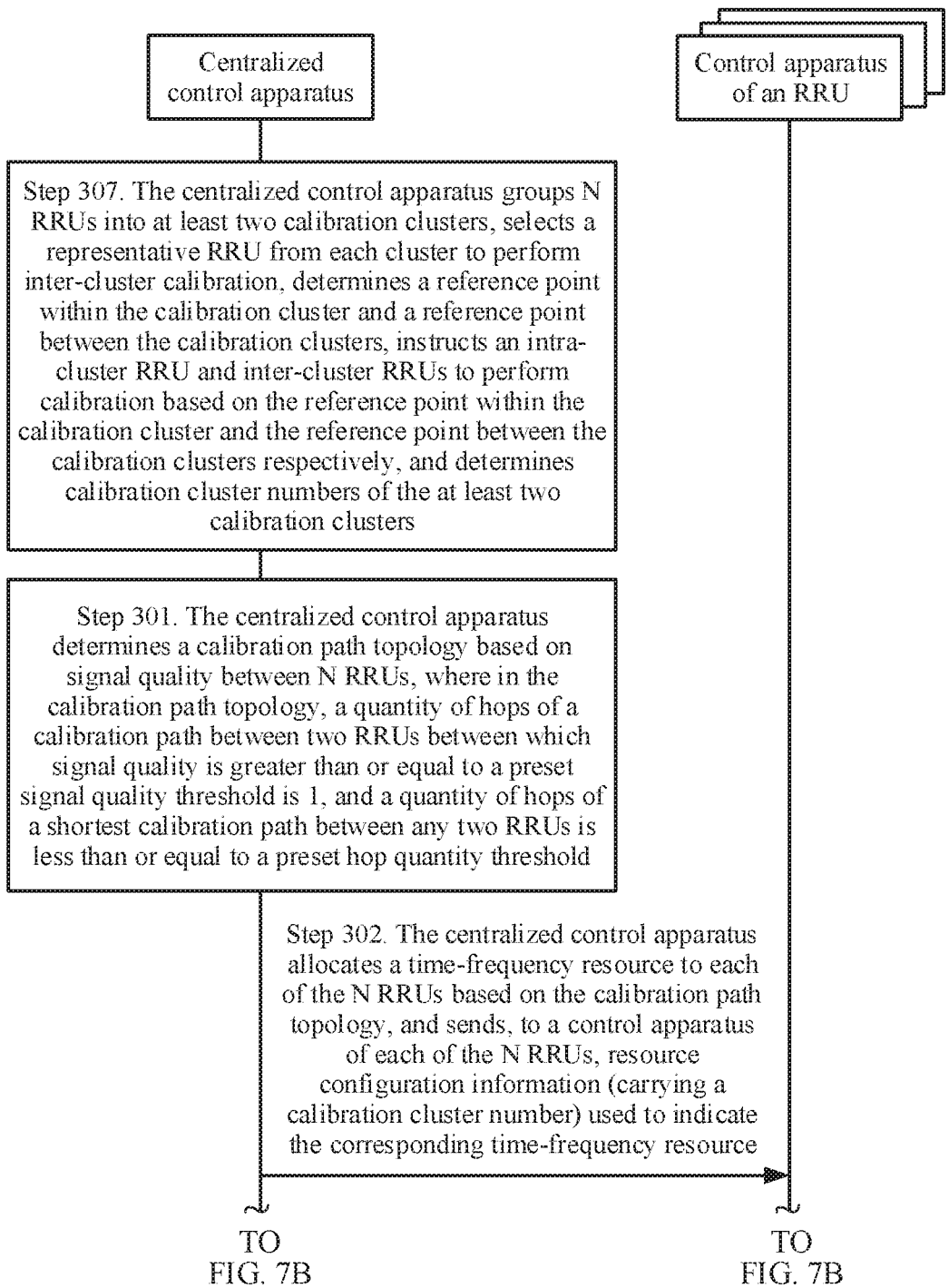
FIG. 7A and FIG. 7B are a method flowchart 3 of an embodiment of a calibration method according to this application.
Figure 7B:
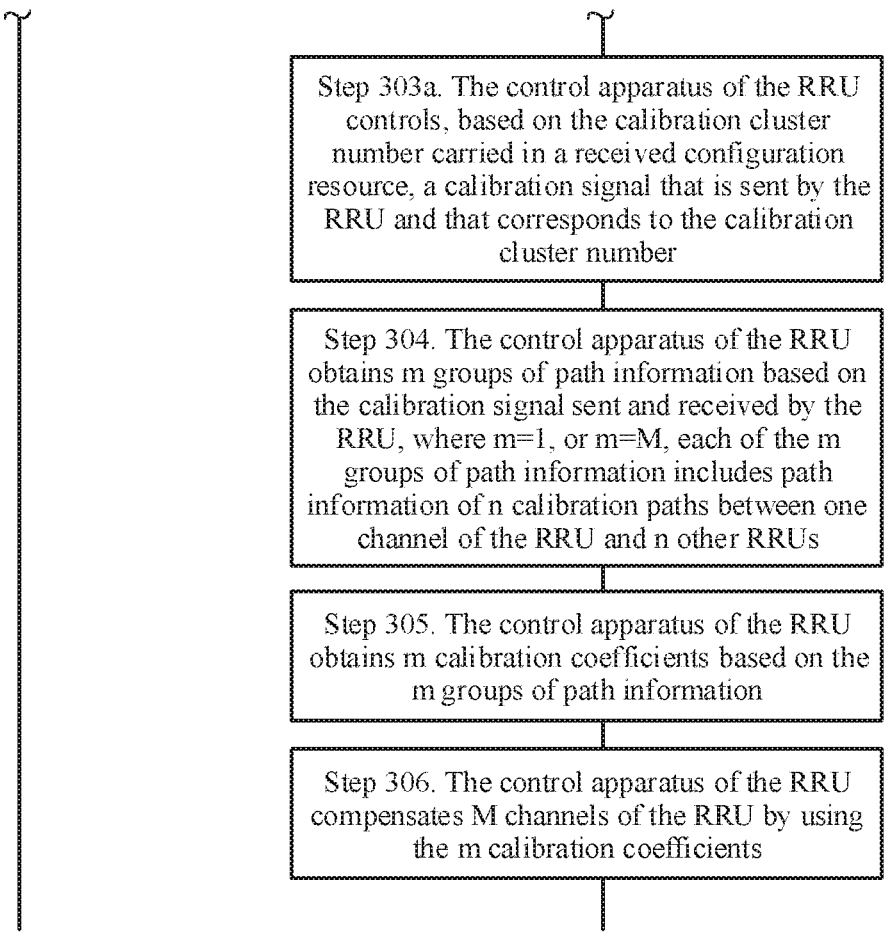

For example, based on FIG. 3, as shown in FIG. 7A and FIG. 7B, before step 302, the method further includes the following step.

Step 307. The centralized control apparatus groups the N RRUs into at least two calibration clusters.

The centralized control apparatus may first group the N RRUs into the at least two calibration clusters. Calibration signals that each have a code division function and that are sent by RRUs in different calibration clusters are orthogonal. Therefore, RRUs in different calibration clusters can send calibration signals on a same frequency domain resource in a same GP without interfering with each other.

In this example, step 303 may specifically include the following step.

Step 303a. The control apparatus of the RRU controls, based on a calibration cluster number carried in the received resource configuration information, a calibration signal that is sent by the RRU and that corresponds to the calibration cluster number.

The control apparatus of the RRU may generate, based on the calibration cluster number, a calibration signal having the code division function. The control apparatus of the RRU may alternatively send the calibration cluster number to the RRU, so that the RRU generates, based on the calibration cluster number, a calibration signal having the code division function.

Optionally, a correspondence between calibration cluster numbers and calibration signals may be pre-stored in the control apparatus of the RRU or the RRU. The control apparatus of the RRU may alternatively select a corresponding calibration signal based on the calibration cluster number, or send the calibration cluster number to the RRU, so that the RRU selects a corresponding calibration signal based on the calibration cluster number.

Figure 8:
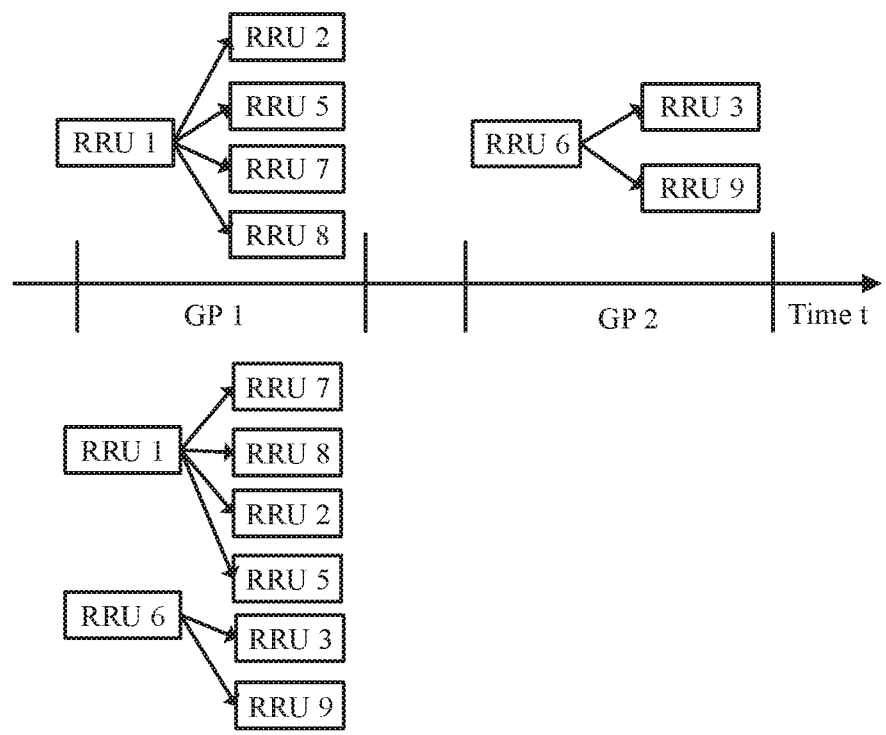
FIG. 8 is a schematic comparison diagram of GP area resource utilization according to this application.

For example, based on the calibration path topology shown in FIG. 4, the RRU 6 sends calibration signals to the RRU 3 and the RRU 9, and the RRU 1 sends calibration signals to the RRU 2, the RRU 5, the RRU 8, and the RRU 7. As shown in FIG. 8, if the calibration signals sent by the RRU 6 and the RRU 1 are not orthogonal, the RRU 6 and the RRU 1 need to send the calibration signals in different GP areas, that is, occupy resources in two GP areas to send the calibration signals. If the calibration signals from the RRU 6 and the RRU 1 have an orthogonal characteristic, both the RRU 6 and the RRU 1 can send the calibration signals in a GP 1 area, and resources in only one GP area need to be occupied.

In this application, resource utilization in a GP area can be improved by using a calibration signal with a code division function, so that more calibration signals can be sent between the N RRUs, and more path information of calibration paths can be obtained to improve a calibration specification.

In this example, when the RRU receives a plurality of calibration signals simultaneously sent by another RRU, the RRU may demodulate a received sequence based on a calibration cluster number of a calibration cluster to which the RRU belongs, to obtain the calibration signals sent by the another RRU to the RRU.

According to the calibration method provided in this application, in the calibration path topology determined by the centralized control apparatus, the quantity of hops of the calibration path between the two RRUs between which the signal quality is greater than or equal to the preset signal quality threshold is 1, and the quantity of hops of the shortest calibration path between any two RRUs is less than or equal to the preset hop quantity threshold. Therefore, the control apparatus of the RRU can obtain the calibration coefficient of the RRU by using a plurality of pieces of path information, so that accumulation of calibration deviations that is caused by propagation of a calibration deviation on a multi-hop calibration path is avoided. Therefore, a calibration deviation between RRUs is reduced, and calibration precision is improved.

With expansion of a calibration scale, a quantity of RRUs that need to be calibrated increases. To improve calibration efficiency, this application further provides a manner in which massive RRUs are grouped into a plurality of sub-clusters, and intra-cluster calibration is performed on RRUs in each sub-cluster synchronously to accelerate calibration.

Specifically, before determining the calibration path topology, the centralized control apparatus first groups K to-be-calibrated RRUs into k sub-clusters. Each of h sub-clusters in the k sub-clusters includes one reference RRU, and the k sub-clusters include at least one reference sub-cluster. The reference sub-cluster is used for inter-cluster calibration for other non-reference sub-clusters.

Figure 11:
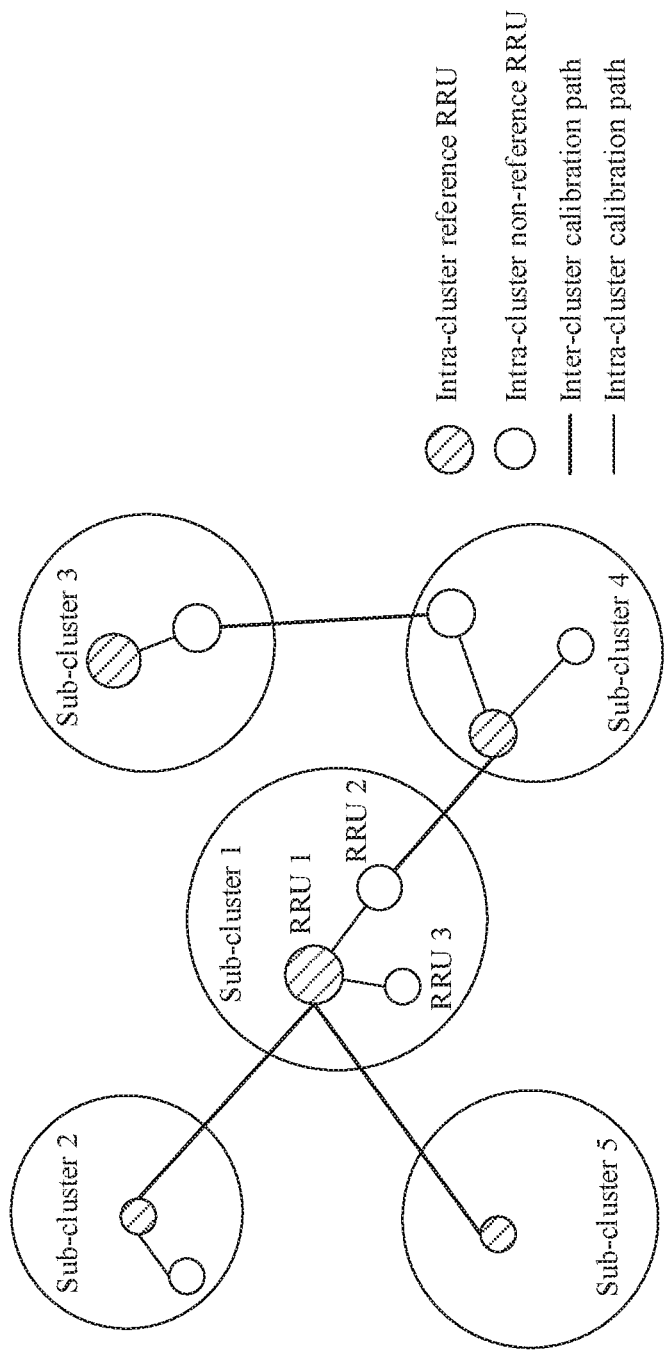
FIG. 11 is a schematic diagram of sub-clusters obtained through grouping according to this application.

For example, as shown in FIG. 11, it is assumed that the k RRUs are grouped into five sub-clusters. A sub-cluster 1 is a reference sub-cluster. A reference RRU in the sub-cluster 1 is an RRU used for inter-cluster calibration for other sub-clusters. Sub-clusters 1 to 5 each include one reference RRU. When intra-cluster calibration is performed on each RRU in the sub-clusters 1 to 5, channels of the RRU may be calibrated by obtaining calibration coefficients relative to a reference RRU in a sub-cluster to which the RRU belongs.

After completing grouping into the sub-clusters, the centralized control apparatus may plan a calibration path topology, including planning a calibration path topology of RRUs in each sub-cluster and an inter-cluster calibration path topology. Then, resources are allocated based on a planned calibration path.

For example, RRUs in the sub-cluster 1 shown in FIG. 11 are used as an example. Both an RRU 1 and an RRU 2 in the sub-cluster 1 are located on inter-cluster calibration paths. Therefore, time-frequency resources allocated by the centralized control apparatus to the RRU 1 and the RRU 2 in the sub-cluster 1 include time-frequency resources used to send and receive calibration signals to and from RRUs in other sub-clusters, and further include time-frequency resource used to send and receive calibration signals to and from other RRUs in the sub-cluster 1. A time-frequency resource allocated by the centralized control apparatus to the RRU 3 in the sub-cluster 1 is used to send and receive calibration signals to and from other RRUs in the sub-cluster 1. It may be understood that resource configuration information may include information such as a cluster number of a sub-cluster to which each RRU is located, an identifier of a reference RRU, a cluster number of a reference sub-cluster, and an identifier of a reference RRU in the reference sub-cluster.

Figures 12A, 12B:
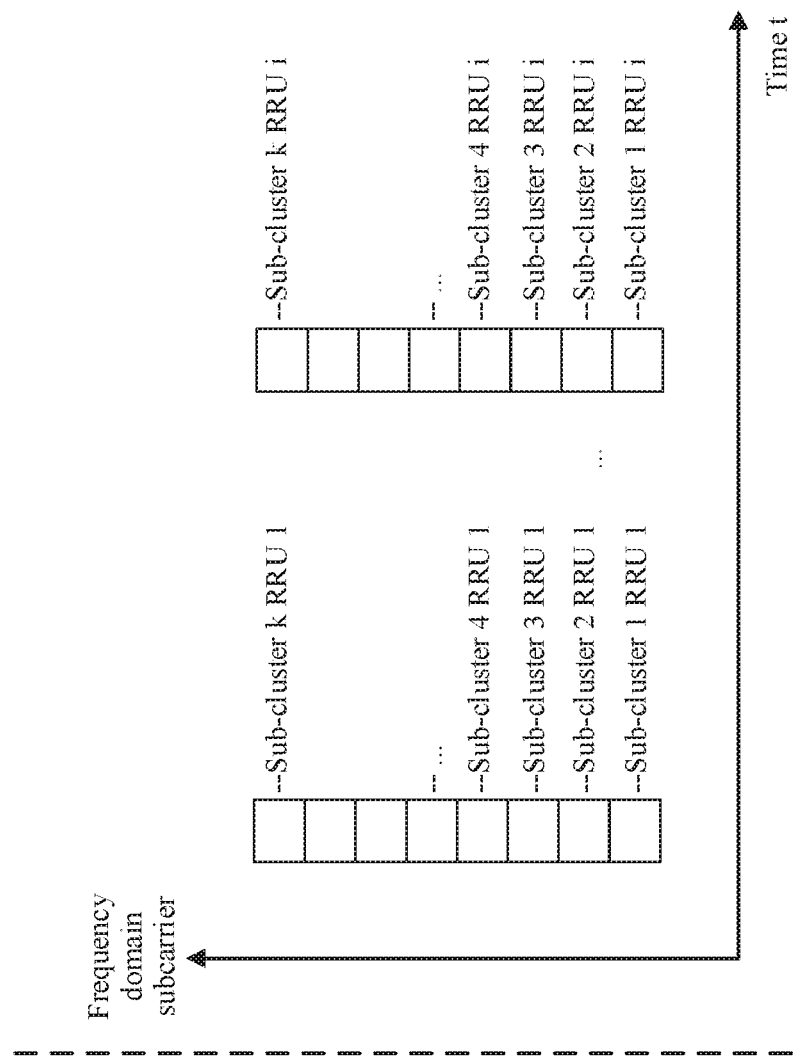
FIG. 12A and FIG. 12B are a schematic diagram of inter-sub-cluster time-frequency resource distribution according to this application.
Figure 12B:
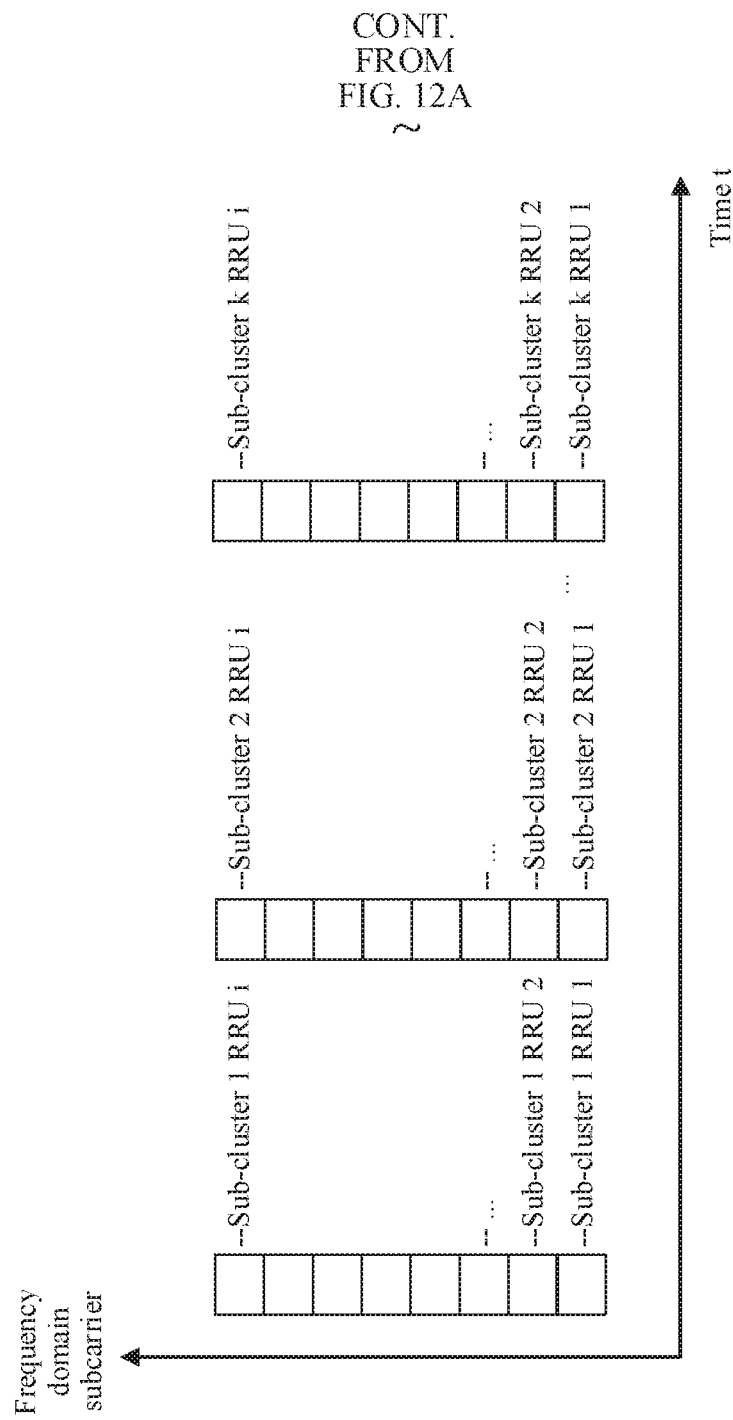

In an example, when performing resource configuration, the centralized control apparatus may configure the RRUs in the sub-cluster to send and receive calibration signals in a frequency division manner, and configure calibration signals to be sent and received in a time division manner between the k sub-clusters. For example, it is assumed that each sub-cluster includes g RRUs. As shown in FIG. 12B, the g RRUs in the sub-cluster simultaneously send calibration signals on j (g≥j≥2) different subcarriers. RRUs in the k sub-clusters (for example, RRUs 1 in the k sub-clusters) sequentially send calibration signals on a same subcarrier.

Alternatively, the centralized control apparatus may configure the RRUs in the sub-cluster to send and receive calibration signals in a time division manner, and configure calibration signal to be sent and received in a frequency division manner between the k sub-clusters. For example, as shown in FIG. 12B, the RRUs in the k sub-clusters (for example, the RRUs 1 in the k sub-clusters, RRUs 2 in the k sub-clusters, . . . , and RRUs i in the k sub-clusters) simultaneously sends calibration signals on j different subcarriers. g RRUs in the sub-cluster sequentially send calibration signals on a same subcarrier.

In this application, intra-cluster calibration may be performed on the RRUs in the sub-cluster according to the calibration method shown in FIG. 3, FIG. 5A and FIG. 5B, or FIG. 7A and FIG. 7B. In other words, in the embodiment shown in FIG. 3, FIG. 5A and FIG. 5B, or FIG. 7A and FIG. 7B, the N RRUs are all RRUs in one sub-cluster. In one sub-cluster, the N RRUs obtain, in the manner of adding path information in the embodiment shown in FIG. 3, FIG. 5A and FIG. 5B, or FIG. 7A and FIG. 7B, calibration coefficients of the N RRUs relative to a reference RRU in the sub-cluster to which the N RRUs belong, and complete calibration.

Alternatively, the RRUs in the sub-cluster may calculate, based on a conventional multi-hop calibration path, calibration coefficients of the N RRUs relative to a reference RRU in the sub-cluster to which the N RRUs belong, and complete calibration.

For inter-cluster calibration, each sub-cluster may be considered as one RRU, and calibration between the k sub-clusters is performed in a manner of calibrating k RRUs.

For example, calibration between the k sub-clusters may alternatively be completed based on the calibration process of the N RRUs in the embodiment shown in FIG. 3, FIG. 5A and FIG. 5B, or FIG. 7A and FIG. 7B.

In this case, for a non-reference RRU in each non-reference sub-cluster, in addition to obtaining m calibration coefficients (that is, calibration coefficients of the RRU relative to a reference RRU in a sub-cluster to which the RRU belongs) obtained when intra-cluster calibration is performed on the RRU, the control apparatus of the RRU further needs to obtain an inter-cluster calibration coefficient (that is, a calibration coefficient of a reference RRU in the sub-cluster to which the RRU belongs relative to a reference RRU in a reference sub-cluster).

For example, the control apparatus of the RRU may receive the inter-cluster calibration coefficient. For example, the control apparatus of the RRU receives an inter-cluster calibration coefficient sent by a control apparatus of another RRU in the sub-cluster to which the RRU belongs. The another RRU is an RRU that is located on an inter-cluster calibration path and that completes inter-cluster calibration. Alternatively, when the k sub-clusters use a conventional multi-hop calibration path, the control apparatus of the RRU may receive an inter-cluster calibration coefficient sent by a control apparatus of an RRU that is in an upper-hop sub-cluster of the sub-cluster to which the RRU belongs.

Alternatively, when the centralized control apparatus calculates each inter-cluster calibration coefficient, the corresponding inter-cluster calibration coefficient may be directly received from the centralized control apparatus.

For example, when the centralized control apparatus calculates each inter-cluster calibration coefficient, at least one RRU on an inter-cluster calibration path in the sub-cluster sends and receives a calibration signal based on a time-frequency resource allocated by the centralized control apparatus, obtains path information of the inter-cluster calibration path, and sends the obtained path information of inter-cluster calibration path to the centralized control apparatus.

The centralized control apparatus calculates, based on received path information of all inter-cluster calibration paths, an inter-cluster calibration coefficient corresponding to each of at least one RRU in the sub-cluster, and then sends the corresponding inter-cluster calibration coefficient to each of the at least one RRU in the sub-cluster.

If the RRU is located on the inter-cluster calibration path, the control apparatus of the RRU may alternatively calculate the inter-cluster calibration coefficient. It is assumed that the RRU is located on i (i≥1) inter-cluster calibration paths, and each inter-cluster calibration path corresponds to one another sub-cluster. In this case, the control apparatus of the RRU needs to control the RRU to send and receive calibration signals to and from an RRU in each of i other sub-clusters, to obtain path information of i inter-cluster calibration paths between the RRU and the i RRUs in the i other sub-clusters. The control apparatus of the RRU obtains an inter-cluster calibration coefficient based on the path information of the i inter-cluster calibration paths.

After calculating the inter-cluster calibration coefficient, the control apparatus of the RRU further needs to send the inter-cluster calibration coefficient to a control apparatus of another RRU in the sub-cluster to which the RRU belongs, so that the another RRU performs inter-cluster calibration by using the inter-cluster calibration coefficient.

After obtaining the m calibration coefficients and the inter-cluster calibration coefficient, when compensating the M channels of the RRU, the RRU may separately multiply the m calibration coefficients by the inter-cluster calibration coefficient, to obtain m joint calibration coefficients. Then, the M channels of the RRU are compensated by using the m joint calibration coefficients.

It may be understood that, for a reference RRU in a non-reference sub-cluster, only the inter-cluster calibration coefficient needs to be used to compensate M channels of the reference RRU. For a non-reference RRU in a reference sub-cluster, only the m calibration coefficients obtained during intra-cluster calibration need to be used to compensate M channels of the non-reference RRU.

The solutions provided in this application are described above mainly from a perspective of interaction between network elements. It may be understood that to implement the foregoing functions, the network elements, such as the control apparatus of the RRU and the centralized control apparatus, include corresponding hardware structures and/or software modules for executing the functions. A person skilled in the art should easily be aware that, in combination with the examples of units and algorithm steps described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the functions for each particular application, but it should not be considered that the implementation goes beyond the scope of this application.

In this application, functional modules of the control apparatus of the RRU, the centralized control apparatus, and the like may be obtained through division based on the foregoing method examples. For example, the functional modules may be divided corresponding to the functions, or two or more functions may be integrated into one processing module. The integrated module may be implemented in a form of hardware, or may be implemented in a form of a software functional module. It should be noted that, in this application, division into the modules is an example, and is merely a logical function division. During actual implementation, another division manner may be used.

Figure 9A:
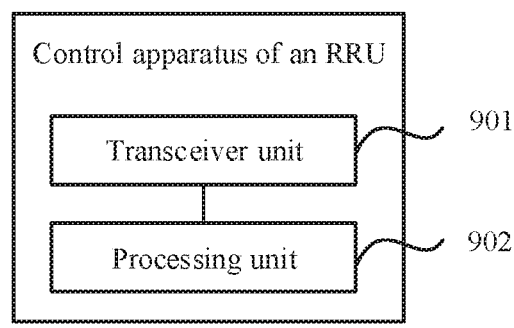
FIG. 9A is a schematic structural diagram 1 of a control apparatus of an RRU according to this application.

When the function modules are divided corresponding to the functions, FIG. 9A is a possible schematic structural diagram of the control apparatus of the RRU in the foregoing embodiments. The control apparatus of the RRU includes a transceiver unit 901 and a processing unit 902. The transceiver unit 901 is configured to support the control apparatus of the RRU in performing step 302 in FIG. 3, FIG. 5A and FIG. 5B, and FIG. 7A and FIG. 7B. The processing unit 902 is configured to support the control apparatus of the RRU in performing steps 303 to 306 in FIG. 3, steps 303, 304, 305a, 305c, and 306 in FIG. 5A and FIG. 5B, and steps 303a and 304 to 306 in FIG. 7A and FIG. 7B. All related content of the steps in the foregoing method embodiments may be cited in function descriptions of the corresponding functional modules. Details are not described herein.

Figure 9B:
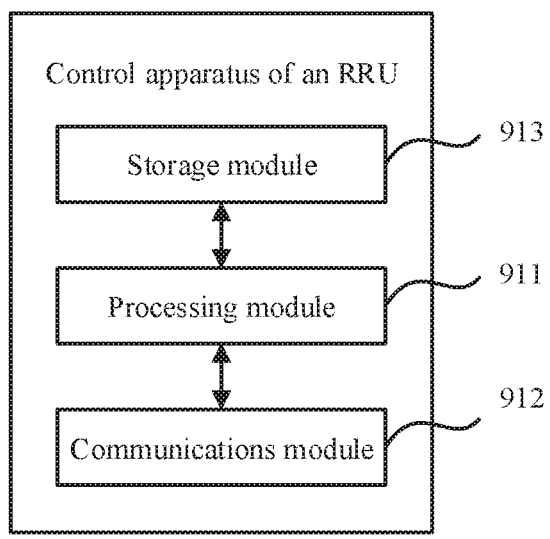
FIG. 9B is a schematic structural diagram 2 of a control apparatus of an RRU according to this application.

When an integrated unit is used, FIG. 9B is a possible schematic structural diagram of the control apparatus of the RRU in the foregoing embodiments. The control apparatus of the RRU includes a processing module 911 and a communications module 912. The processing module 911 is configured to control and manage actions of the control apparatus of the RRU. For example, the processing module 911 is configured to support the control apparatus of the RRU in performing steps 302 to 306 in FIG. 3, steps 302 to 304, 305a, 305c, and 306 in FIG. 5A and FIG. 5B, and steps 302, 303a, and 304 to 306 in FIG. 7A and FIG. 7B, and/or configured to perform another process of the technology described in this specification. The communications module 912 is configured to support communication between the control apparatus of the RRU and another network entity. The control apparatus of the RRU may further include a storage module 913, configured to store program code and data of the control apparatus of the RRU.

The processing module 911 may be a processor or a controller, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processing module 911 may implement or execute various example logical blocks, modules, and circuits described with reference to content disclosed in this application. The processor may alternatively be a combination for implementing a computing function, for example, a combination of one or more microprocessors, or a combination of the DSP and a microprocessor. The communications module 912 may be a transceiver, a transceiver circuit, a communications interface, or the like. The storage module 913 may be a memory.

Figure 9C:
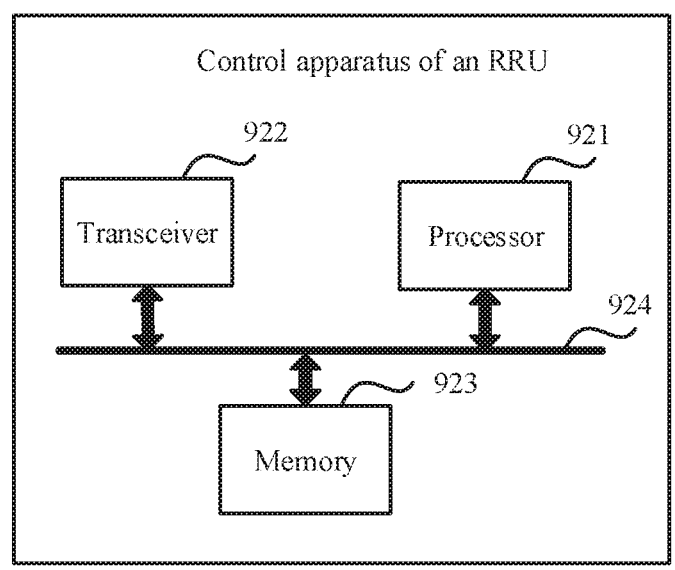
FIG. 9C is a schematic structural diagram 3 of a control apparatus of an RRU according to this application.

When the processing module 911 is a processor, the communications module 912 is a transceiver, and the storage module 913 is a memory, the control apparatus of the RRU in this application may be a control apparatus of an RRU shown in FIG. 9C.

Referring to FIG. 9C, the control apparatus of the RRU includes a processor 921, a transceiver 922, a memory 923, and a bus 924. The transceiver 922, the processor 921, and the memory 923 are connected to each other by using the bus 924. The bus 924 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 9C, but this does not mean that there is only one bus or only one type of bus.

Figure 10A:
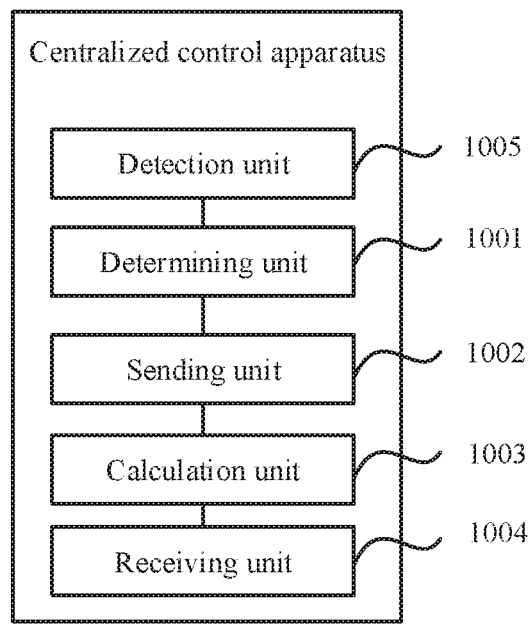
FIG. 10A is a schematic structural diagram 1 of a centralized control apparatus according to this application.

When the function modules are divided corresponding to the functions, FIG. 10A is a possible schematic structural diagram of the centralized control apparatus in the foregoing embodiments. The centralized control apparatus includes a determining unit 1001, a sending unit 1002, a calculation unit 1003, a receiving unit 1004, and a detection unit 1005. The determining unit 1001 is configured to support the centralized control apparatus in performing step 301 in FIG. 3, FIG. 5A and FIG. 5B, and FIG. 7A and FIG. 7B. The sending unit 1002 is configured to support the centralized control apparatus in performing step 302 in FIG. 3 and FIG. 7A and FIG. 7B and step 305c in FIG. 5A and FIG. 5B. The calculation unit 1003 is configured to support the centralized control apparatus in performing step 305b in FIG. 5A and FIG. 5B. The receiving unit 1004 is configured to support the centralized control apparatus in performing step 305a in FIG. 5A and FIG. 5B. The detection unit 1005 is configured to support the centralized control apparatus in performing step 307 in FIG. 7A and FIG. 7B. All related content of the steps in the foregoing method embodiments may be cited in function descriptions of the corresponding functional modules. Details are not described herein.

Figure 10B:
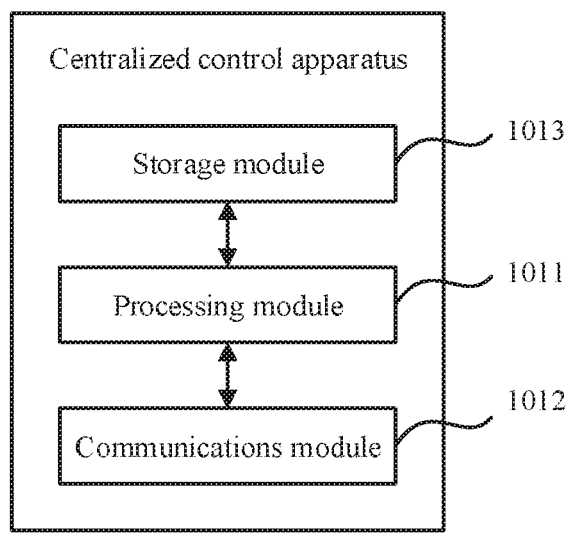
FIG. 10B is a schematic structural diagram 2 of a centralized control apparatus according to this application.

When an integrated unit is used, FIG. 10B is a possible schematic structural diagram of the centralized control apparatus in the foregoing embodiments. The centralized control apparatus includes a processing module 1011 and a communications module 1012. The processing module 1011 is configured to control and manage actions of the centralized control apparatus. For example, the processing module 1011 is configured to support the centralized control apparatus in performing steps 301 and 302 in FIG. 3, steps 301, 302, and 305a to 305c in FIG. 5A and FIG. 5B, and steps 307, 301, and 302 in FIG. 7A and FIG. 7B, and/or configured to perform another process of the technology described in this specification. The communications module 1012 is configured to support communication between the centralized control apparatus and another network entity. The centralized control apparatus may further include a storage module 1013, configured to store program code and data of the centralized control apparatus.

The processing module 1011 may be a processor or a controller, for example, may be a CPU, a general purpose processor, a DSP, an ASIC, an FPGA or another programmable logic device, a transistor logic device, a hardware component, or any combination thereof. The processing module 1011 may implement or execute various example logical blocks, modules, and circuits described with reference to content disclosed in this application. The processor may alternatively be a combination for implementing a computing function, for example, a combination of one or more microprocessors or a combination of the DSP and a microprocessor. The communications module 1012 may be a transceiver, a transceiver circuit, a communications interface, or the like. The storage module 1013 may be a memory.

Figure 10C:
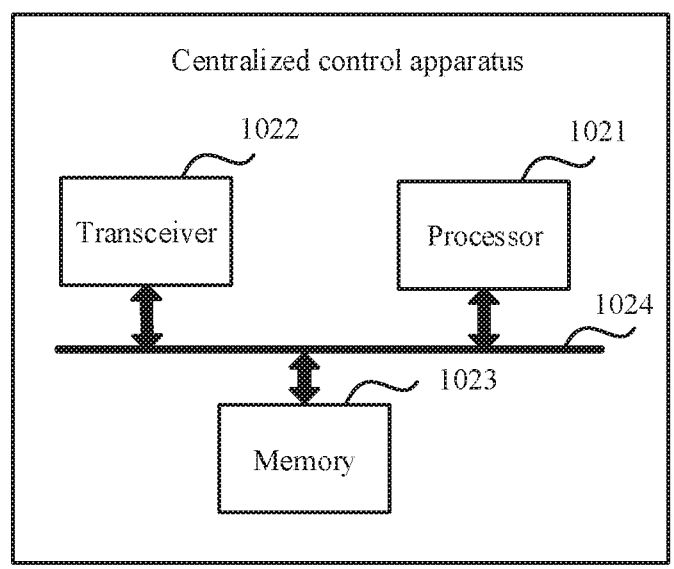
FIG. 10C is a schematic structural diagram 3 of a centralized control apparatus according to this application.

When the processing module 1011 is a processor, the communications module 1012 is a transceiver, and the storage module 1013 is a memory, the centralized control apparatus in this application may be a centralized control apparatus shown in FIG. 10C.

Referring to FIG. 10C, the centralized control apparatus includes a processor 1021, a transceiver 1022, a memory 1023, and a bus 1024. The transceiver 1022, the processor 1021, and the memory 1023 are connected to each other by using the bus 1024. The bus 1024 may be a PCI bus, an EISA bus, or the like. The bus may be classified into an address bus, a data bus, a control bus, and the like. For ease of representation, only one thick line is used to represent the bus in FIG. 10C, but this does not mean that there is only one bus or only one type of bus.

This application further provides a communications apparatus, including units or means configured to perform the steps performed by the control apparatus of the RRU and/or the centralized control apparatus. The communications apparatus may be a chip. During specific implementation, this application further provides a computer storage medium. The computer storage medium may store a program. When the program is executed, some or all of the steps in the embodiments of the calibration method provided in this application may be performed. The storage medium may be a magnetic disk, an optical disc, a read-only memory (ROM), a random access memory (RAM), or the like.

This application further provides a computer program product including an instruction. When run on a computer, the computer program product enables the computer to perform some or all of the steps in the embodiments of the calibration method provided in this application.

A person skilled in the art may clearly understand that, the technologies in the embodiments of this application may be implemented by software in addition to a necessary general hardware platform. Based on such an understanding, the technical solutions in the embodiments of this application essentially or the part contributing to the prior art may be implemented in a form of a computer software product. The computer software product may be stored in a storage medium, such as a ROM/RAM, a magnetic disk, or an optical disc, and includes several instructions for instructing a computer device (which may be a personal computer, a server, a network device, or the like) to perform the methods described in the embodiments or some parts of the embodiments of this application.

For same or similar parts in the embodiments in this specification, refer to each other. Particularly, the embodiments of the centralized control apparatus are basically similar to the method embodiments, and therefore are described briefly. For related parts, refer to descriptions in the method embodiments.

The foregoing implementations of this application are not intended to limit the protection scope of this application.

What is claimed is:

1. A calibration method, comprising:
   receiving, by a control apparatus of a remote radio unit (RRU), resource configuration information from a centralized control apparatus, wherein a time-frequency resource indicated by the resource configuration information is used to send and receive a calibration signal between the RRU and n other RRUs, the n other RRUs are RRUs in a calibration path topology determined by the centralized control apparatus, a quantity of hops of a calibration path between the RRU and each of the n other RRUs is 1, and a quantity of hops of a shortest calibration path between any two RRUs in the calibration path topology is less than or equal to a preset hop quantity threshold, wherein n is a natural number greater than or equal to 1;
   controlling, by the control apparatus of the RRU based on the resource configuration information, the RRU to send and receive a calibration signal on the time-frequency resource;
   obtaining, by the control apparatus of the RRU, m groups of path information based on the calibration signal sent and received by the RRU, wherein m=1, or m=M, M is a quantity of channels of the RRU, and each of the m groups of path information comprises path information of n calibration paths between one channel of the RRU and the n other RRUs;
   obtaining, by the control apparatus of the RRU, m calibration coefficients based on the m groups of path information; and
   compensating, by the control apparatus of the RRU, the M channels of the RRU by using the m calibration coefficients.

2. The method according to claim 1, wherein the obtaining, by the control apparatus of the RRU, m calibration coefficients based on the m groups of path information comprises:
   calculating, by the control apparatus of the RRU, the m calibration coefficients based on the m groups of path information; or
   sending, by the control apparatus of the RRU, the m groups of path information to the centralized control apparatus, wherein the m calibration coefficients are calculated based on the m groups of path information; and
   receiving, by the control apparatus of the RRU, the m calibration coefficients from the centralized control apparatus.

3. The method according to claim 1, wherein when the M channels are not calibrated, m=M, the m groups of path information correspond one-to-one to the M channels, and the m calibration coefficients correspond one-to-one to the M channels.

4. The method according to claim 3, wherein the controlling, by the control apparatus of the RRU based on the resource configuration information, the RRU to send and receive a calibration signal on the time-frequency resource comprises:
   controlling, by the control apparatus of the RRU based on the resource configuration information, the M channels to send calibration signals to each of the n other RRUs on M different carrier resources, and receive, on n different frequency domain resources, calibration signals from the n other RRUs.

5. The method according to claim 1, wherein the resource configuration information further comprises a calibration cluster number of the RRU, and the controlling, by the control apparatus of the RRU based on the resource configuration information, the RRU to send and receive a calibration signal on the time-frequency resource comprises:
   controlling, by the control apparatus of the RRU based on the calibration cluster number, a calibration signal that is from the RRU and that corresponds to the calibration cluster number, wherein the calibration signal from the RRU and a calibration signal from an RRU whose calibration cluster number is different from the calibration cluster number of the RRU are code division-orthogonal.

6. The method according to claim 1, wherein the RRU is an RRU in a sub-cluster, and the method further comprises:
   receiving, by the control apparatus of the RRU, an inter-cluster calibration coefficient, wherein the inter-cluster calibration coefficient is a calibration coefficient of a reference RRU in the sub-cluster to which the RRU belongs relative to a reference RRU in a reference sub-cluster, and the m calibration coefficients are calibration coefficients of the RRU relative to the reference RRU in the sub-cluster to which the RRU belongs; and the compensating, by the control apparatus of the RRU, the M channels of the RRU by using the m calibration coefficients comprises:
  separately multiplying, by the control apparatus of the RRU, the m calibration coefficients by the inter-cluster calibration coefficient, to obtain m joint calibration coefficients; and
  compensating, by the control apparatus of the RRU, the M channels of the RRU by using the m joint calibration coefficients.

7. The method according to claim 1, wherein the RRU is an RRU in a sub-cluster, and the method further comprises:
  controlling, by the control apparatus of the RRU, the RRU to send and receive a calibration signal with an RRU in each of i other sub-clusters, to obtain path information of i inter-cluster calibration paths between the RRU and the i RRUs in the i other sub-clusters, wherein i≥1, and i is an integer;
  obtaining, by the control apparatus of the RRU, an inter-cluster calibration coefficient based on the path information of the i calibration paths; and
  sending, by the control apparatus of the RRU, the inter-cluster calibration coefficient to a control apparatus of another RRU in the sub-cluster to which the RRU belongs; and
  the compensating, by the control apparatus of the RRU, the M channels of the RRU by using the m calibration coefficients comprises:
  separately multiplying, by the control apparatus of the RRU, the m calibration coefficients by the inter-cluster calibration coefficient, to obtain m joint calibration coefficients.

8. A control apparatus of a remote radio unit (RRU), comprising:
  a memory, configured to store a computer program; and
  at least one processor, configured to execute the computer program stored in the memory, to cause the control apparatus of the RRU to perform:
  receiving resource configuration information from a centralized control apparatus, wherein a time-frequency resource indicated by the resource configuration information is used to send and receive a calibration signal between the RRU and n other RRUs, the n other RRUs are RRUs in a calibration path topology determined by the centralized control apparatus, a quantity of hops of a calibration path between the RRU and each of the n other RRUs is 1, and a quantity of hops of a shortest calibration path between any two RRUs in the calibration path topology is less than or equal to a preset hop quantity threshold, wherein n is a natural number greater than or equal to 1; and
  controlling, based on the resource configuration information, the RRU to send and receive the calibration signal on the time-frequency resource;
  obtaining m groups of path information based on the calibration signal sent and received by the RRU, wherein m=1, or m=M, M is a quantity of channels of the RRU, and each of the m groups of path information comprises path information of n calibration paths between one channel of the RRU and the n other RRUs;
  obtaining m calibration coefficients based on the m groups of path information; and
  compensating the M channels of the RRU by using the m calibration coefficients.

9. The control apparatus of the RRU according to claim 8, wherein that the obtaining the m calibration coefficients based on the m groups of path information comprises:
  calculating the m calibration coefficients based on the m groups of path information; or
  sending the m groups of path information to the centralized control apparatus, wherein the m calibration coefficients are calculated based on the m groups of path information; and
  receiving the m calibration coefficients from the centralized control apparatus.

10. The control apparatus of the RRU according to claim 8, wherein when the M channels are not calibrated, m=M, the m groups of path information correspond one-to-one to the M channels, and the m calibration coefficients correspond one-to-one to the M channels.

11. The control apparatus of the RRU according to claim 10, wherein that the controlling, based on the resource configuration information, the RRU to send and receive a calibration signal on the time-frequency resource comprises:
  controlling, based on the resource configuration information, the M channels to send calibration signals to each of the n other RRUs on M different carrier resources, and receive, on n different frequency domain resources, calibration signals from the n other RRUs.

12. The control apparatus of the RRU according to claim 8, wherein the resource configuration information further comprises a calibration cluster number of the RRU, and that the controlling, based on the resource configuration information, the RRU to send and receive a calibration signal on the time-frequency resource comprises:
  controlling, based on the calibration cluster number, a calibration signal that is from the RRU and that corresponds to the calibration cluster number, wherein the calibration signal from the RRU and a calibration signal from an RRU whose calibration cluster number is different from the calibration cluster number of the RRU are code division-orthogonal.

13. The control apparatus of the RRU according to claim 8, wherein the RRU is an RRU in a sub-cluster;
  wherein the at least one processor executes program instructions to cause the control apparatus of the RRU to further perform:
  receiving an inter-cluster calibration coefficient, wherein the inter-cluster calibration coefficient is a calibration coefficient of a reference RRU in the sub-cluster to which the RRU belongs relative to a reference RRU in a reference sub-cluster, and the m calibration coefficients are calibration coefficients of the RRU relative to the reference RRU in the sub-cluster to which the RRU belongs; and
  compensating the M channels of the RRU by using the m calibration coefficients comprises:
  separately multiplying the m calibration coefficients by the inter-cluster calibration coefficient, to obtain m joint calibration coefficients; and
  compensating the M channels of the RRU by using the m joint calibration coefficients.

14. The control apparatus of the RRU according to claim 8, wherein the RRU is an RRU in a sub-cluster;
  wherein the at least one processor executes program instructions to cause the control apparatus of the RRU to further perform:
  controlling the RRU to send and receive a calibration signal with an RRU in each of i other sub-clusters, to obtain path information of i inter-cluster calibration paths between the RRU and the i RRUs in the i other sub-clusters, wherein i≥1;
  obtaining an inter-cluster calibration coefficient based on the path information of the i calibration paths; and sending the inter-cluster calibration coefficient to a control apparatus of another RRU in the sub-cluster to which the RRU belongs; and compensating the M channels of the RRU by using the m calibration coefficients comprises:

separately multiplying the m calibration coefficients by the inter-cluster calibration coefficient, to obtain m joint calibration coefficients.

15. A centralized control apparatus, comprising:

a memory, configured to store a computer program; and at least one processor, configured to execute the computer program stored in the memory, to cause the centralized control apparatus to perform:

determining a calibration path topology based on signal quality between N remote radio units (RRUs), wherein in the calibration path topology, a quantity of hops of a calibration path between two RRUs between which signal quality is greater than or equal to a preset signal quality threshold is 1, and a quantity of hops of a shortest calibration path between any two RRUs is less than or equal to a preset hop quantity threshold; and allocating a time-frequency resource to each of the N RRUs based on the calibration path topology, and sending, to a control apparatus of each of the N RRUs, configuration information indicating the corresponding time-frequency resource, wherein the time-frequency resource corresponding to the RRU is used by the RRU to send and receive a calibration signal.

16. The centralized control apparatus according to claim 15, after sending, to the control apparatus of the RRU, the configuration information indicating the corresponding time-frequency resource, receiving N1 pieces of path information from the control apparatuses of the N RRUs, wherein the path information is path information of a calibration path on which a quantity of hops is 1, $N-1 \leq N1 \leq C_N^2$, and $C_N^2$ represents a total quantity of calibration paths that is obtained when a quantity of hops of a calibration path between any two of the N RRUs is 1, wherein N1 is an integer;

calculating, based on the N1 pieces of path information, a calibration coefficient corresponding to the RRU; and sending the corresponding calibration coefficient to the control apparatus of the RRU.

17. The centralized control apparatus according to claim 16, wherein that the receiving the N1 pieces of path information from the control apparatuses of the N RRUs comprises:

for each of the N RRUs:

receiving m groups of path information from the control apparatus of the RRU, wherein each group of path information comprises n pieces of information, wherein m=1, or m=M, M is a quantity of channels of the RRU, and n is a quantity of RRUs, a quantity of hops of a calibration path between each of the n RRUs and the RRU is 1, wherein there are m calibration coefficients corresponding to the RRU.

18. The centralized control apparatus according to claim 16, wherein the at least one processor executes program instructions to cause the centralized control apparatus to further perform:

grouping K RRUs into k sub-clusters before determining the calibration path topology based on the signal quality between the N RRUs, wherein each of h sub-clusters in the k sub-clusters comprises one reference RRU, the k sub-clusters comprise at least one reference sub-cluster, and the N RRUs are all RRUs in one of the k sub-clusters.

19. The centralized control apparatus according to claim 18, wherein the at least one processor executes program instructions to cause the centralized control apparatus to further perform:

receiving path information of an inter-cluster calibration path that is from at least one RRU in the sub-cluster;

calculating, based on path information of inter-cluster calibration paths, an inter-cluster calibration coefficient corresponding to each of the at least one RRU in the sub-cluster; and sending the corresponding inter-cluster calibration coefficient to each of the at least one RRU in the sub-cluster.

20. The centralized control apparatus according to claim 15, wherein before allocating the time-frequency resource to each of the N RRUs based on the calibration path topology, grouping the N RRUs into at least two calibration clusters, and determining calibration cluster numbers of the at least two calibration clusters; and wherein the configuration information further comprises a calibration cluster number of a calibration cluster to which the RRU belongs.

21. The centralized control apparatus according to claim 15, wherein the at least one processor executes program instructions to cause the centralized control apparatus to further perform:

periodically detecting the signal quality between the N RRUs; and re-determining a calibration path topology when finding, through detection, that signal quality between any two of the N RRUs changes from being greater than or equal to the preset signal quality threshold to being less than the preset signal quality threshold.

* * * * *